(12) United States Patent
Hyun et al.

(10) Patent No.: US 12,667,976 B2
(45) Date of Patent: Jun. 30, 2026

(54) ROBOT DEVICE AND OPERATING METHOD THEREOF FOR DELIVERING OBJECT TO TARGET TABLE

(71) Applicant: Samsung Electronics Co., Ltd., Suwon-si (KR)

(72) Inventors: Sangmin Hyun, Suwon-si (KR); Jungmi Park, Suwon-si (KR); Yoojin Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 18/459,293

(22) Filed: Aug. 31, 2023

(65) Prior Publication Data

US 2024/0017419 A1    Jan. 18, 2024

Related U.S. Application Data

(63) Continuation of application No. PCT/KR2023/010024, filed on Jul. 13, 2023.

(30) Foreign Application Priority Data

Jul. 14, 2022    (KR) ........................ 10-2022-0087083

(51) Int. Cl.
B25J 11/00       (2006.01)
B25J 5/00        (2006.01)
          (Continued)

(52) U.S. Cl.
CPC ............. B25J 11/008 (2013.01); B25J 5/007 (2013.01); B25J 9/161 (2013.01); B25J 9/1664 (2013.01);
          (Continued)

(58) Field of Classification Search
CPC . B25J 11/008; B25J 5/007; B25J 9/161; B25J 9/1664; B25J 9/1679; B25J 13/086; B25J 15/0014
See application file for complete search history.

(56) References Cited

U.S. PATENT DOCUMENTS 8,272,466 B2      9/2012  Moriguchi et al.
11,279,042 B2 *   3/2022  Ha ........................ G05D 1/622
          (Continued)

FOREIGN PATENT DOCUMENTS

JP        2021-062694 A      4/2021
JP            7473201 B2     4/2024
          (Continued)

OTHER PUBLICATIONS

International Search Report with Written Opinion dated Oct. 24, 223; International Appln. No. PCT/KR2023/010024.

*Primary Examiner* — Adam R Mott
*Assistant Examiner* — Matthew C Gammon
(74) *Attorney, Agent, or Firm* — Jefferson IP Law, LLP

(57)          ABSTRACT

A robot device is provided. The robot includes a movement unit moving the robot device, a body unit coupled to an upper end of the movement unit and including a tray capable of accommodating an object and a support unit supporting the tray at a certain height, a memory, and a processor configured to receive an external input including information about a target table, control, based on the information about the target table, the movement unit to move to the target table, start to rotate the body unit independently of the movement unit as the movement unit is located at a first certain distance from the target table during movement thereto, and stop the rotation of the body unit when a side surface not covered by the support unit among side surfaces of the tray is parallel to a side surface of the target table.

16 Claims, 22 Drawing Sheets

(51) Int. Cl.
   *B25J 9/16* (2006.01)
   *B25J 13/08* (2006.01)
   *B25J 15/00* (2006.01)

(52) U.S. Cl.
   CPC ........... *B25J 9/1679* (2013.01); *B25J 13/086*
   (2013.01); *B25J 15/0014* (2013.01)

(56) References Cited

U.S. PATENT DOCUMENTS

| | | | |
|---|---|---|---|
| 11,370,123 B2 | 6/2022 | Lee | |
| 11,540,627 B2 | 1/2023 | Jung et al. | |
| 11,571,102 B2 | 2/2023 | Jang et al. | |
| 11,703,867 B2 | 7/2023 | Inoue et al. | |
| 11,945,096 B2 | 4/2024 | Mei et al. | |
| 2012/0156788 A1* | 6/2012 | Kim ................. | G01N 35/00722 |
| | | | 422/63 |
| 2020/0030972 A1 | 1/2020 | Kim | |
| 2020/0122333 A1 | 4/2020 | Park et al. | |
| 2021/0187749 A1 | 6/2021 | Lee et al. | |
| 2021/0212455 A1* | 7/2021 | Jung ........................ | B25J 5/007 |
| 2021/0323581 A1 | 10/2021 | Ju et al. | |
| 2021/0402610 A1* | 12/2021 | Lee ........................ | B25J 11/008 |

FOREIGN PATENT DOCUMENTS

| | | |
|---|---|---|
| KR | 10-1679058 B1 | 11/2016 |
| KR | 10-918228 B1 | 1/2019 |
| KR | 10-2019-0106909 A | 9/2019 |
| KR | 10-2019-0106910 A | 9/2019 |
| KR | 10-2020-0085658 A | 7/2020 |
| KR | 10-2021-0104000 A | 8/2021 |

* cited by examiner

Figure 11:
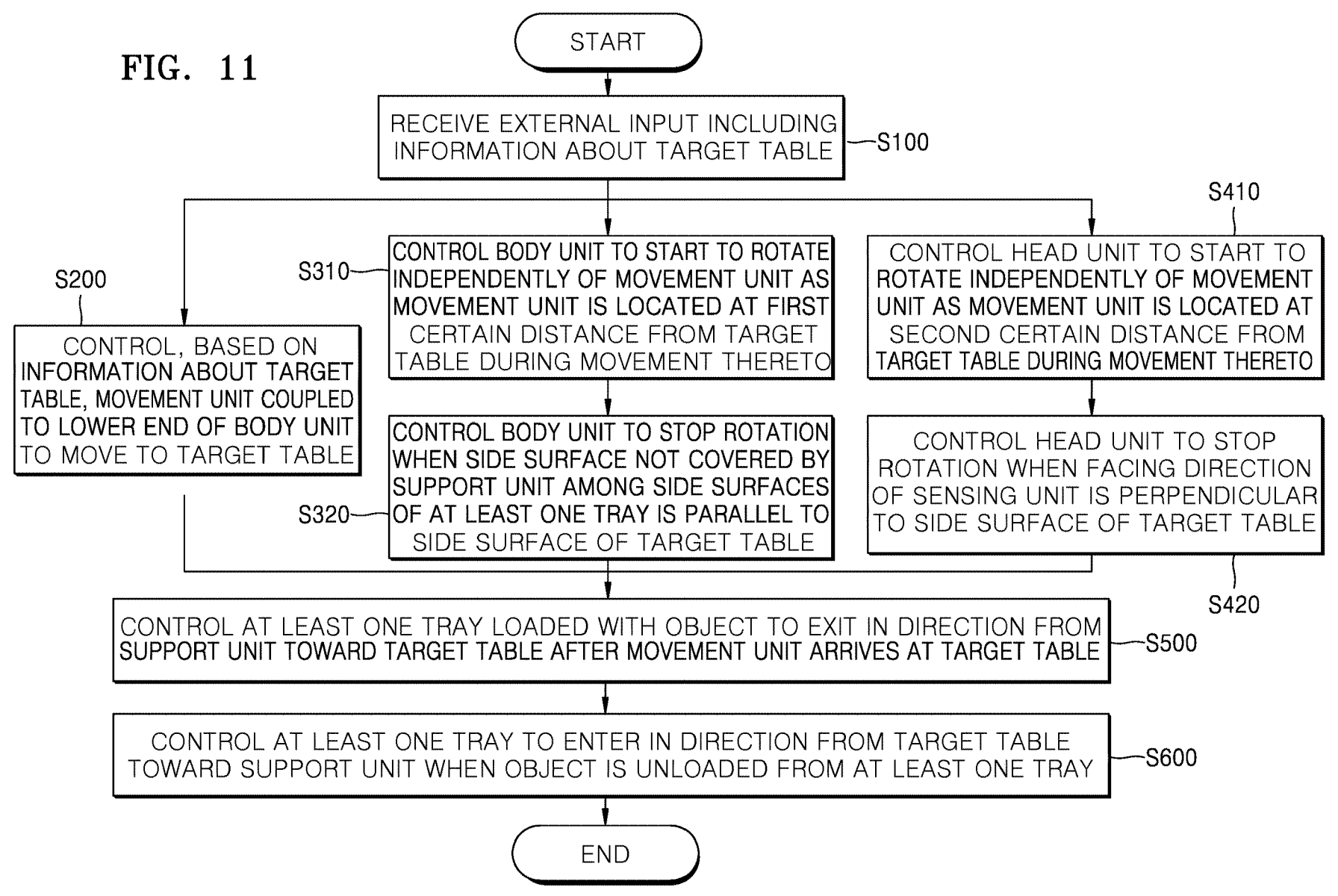

START

RECEIVE EXTERNAL INPUT INCLUDING INFORMATION ABOUT TARGET TABLE — S100

CONTROL, BASED ON INFORMATION ABOUT TARGET TABLE, MOVEMENT UNIT COUPLED TO LOWER END OF BODY UNIT TO MOVE TO TARGET TABLE — S200

CONTROL BODY UNIT TO START TO ROTATE INDEPENDENTLY OF MOVEMENT UNIT AS MOVEMENT UNIT IS LOCATED AT FIRST CERTAIN DISTANCE FROM TARGET TABLE DURING MOVEMENT THERETO — S310

CONTROL HEAD UNIT TO START TO ROTATE INDEPENDENTLY OF MOVEMENT UNIT AS MOVEMENT UNIT IS LOCATED AT SECOND CERTAIN DISTANCE FROM TARGET TABLE DURING MOVEMENT THERETO — S410

CONTROL BODY UNIT TO STOP ROTATION WHEN SIDE SURFACE NOT COVERED BY SUPPORT UNIT AMONG SIDE SURFACES OF AT LEAST ONE TRAY IS PARALLEL TO SIDE SURFACE OF TARGET TABLE — S320

CONTROL HEAD UNIT TO STOP ROTATION WHEN FACING DIRECTION OF SENSING UNIT IS PERPENDICULAR TO SIDE SURFACE OF TARGET TABLE — S420

CONTROL AT LEAST ONE TRAY LOADED WITH OBJECT TO EXIT IN DIRECTION FROM SUPPORT UNIT TOWARD TARGET TABLE AFTER MOVEMENT UNIT ARRIVES AT TARGET TABLE — S500

CONTROL AT LEAST ONE TRAY TO ENTER IN DIRECTION FROM TARGET TABLE TOWARD SUPPORT UNIT WHEN OBJECT IS UNLOADED FROM AT LEAST ONE TRAY — S600

END

FIG. 14

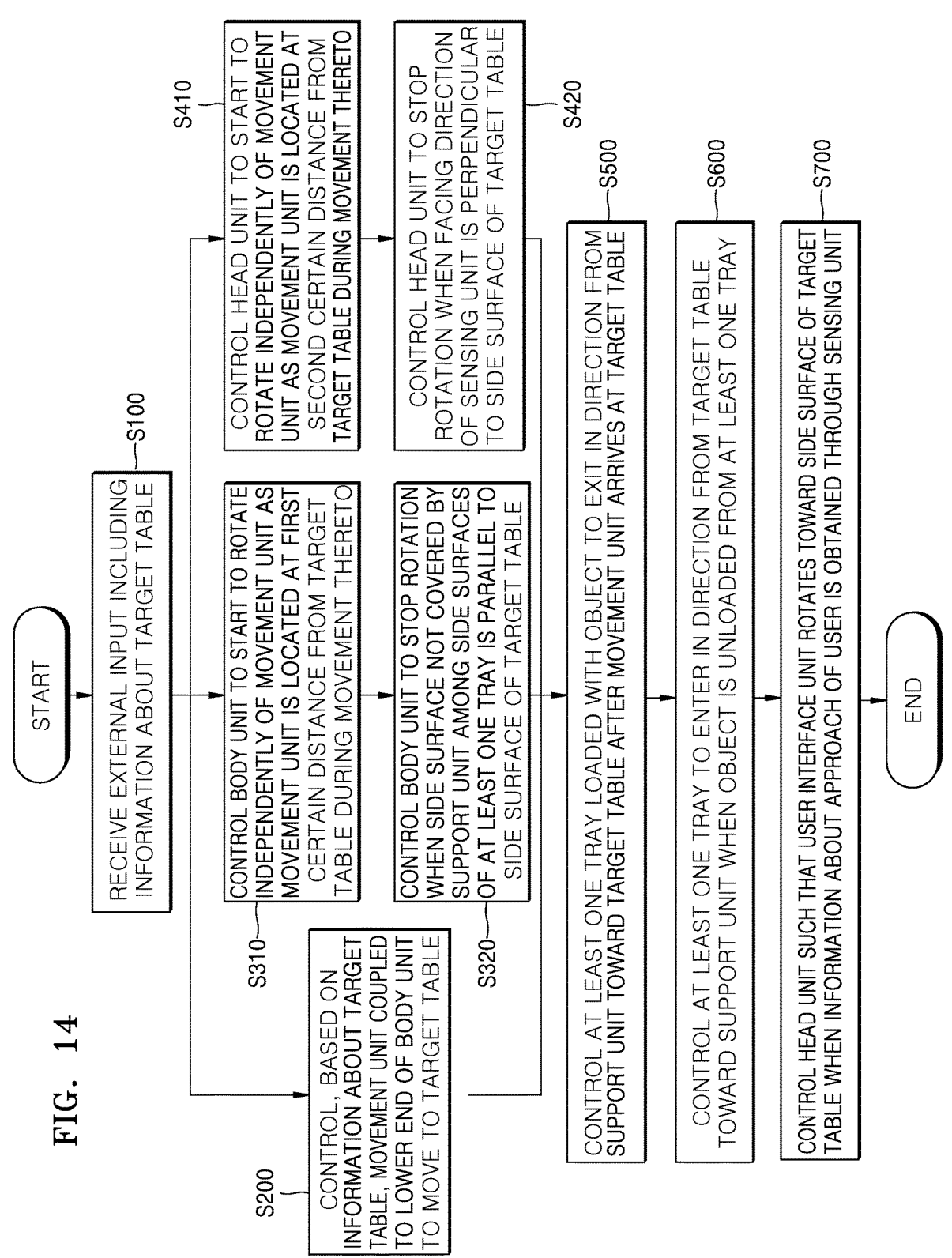

START

RECEIVE EXTERNAL INPUT INCLUDING INFORMATION ABOUT TARGET TABLE —S100

CONTROL, BASED ON INFORMATION ABOUT TARGET TABLE, MOVEMENT UNIT COUPLED TO LOWER END OF BODY UNIT TO MOVE TO TARGET TABLE — S200

CONTROL BODY UNIT TO START TO ROTATE INDEPENDENTLY OF MOVEMENT UNIT AS MOVEMENT UNIT IS LOCATED AT FIRST CERTAIN DISTANCE FROM TARGET TABLE DURING MOVEMENT THERETO — S310

CONTROL HEAD UNIT TO START TO ROTATE INDEPENDENTLY OF MOVEMENT UNIT AS MOVEMENT UNIT IS LOCATED AT SECOND CERTAIN DISTANCE FROM TARGET TABLE DURING MOVEMENT THERETO — S410

CONTROL BODY UNIT TO STOP ROTATION WHEN SIDE SURFACE NOT COVERED BY SUPPORT UNIT AMONG SIDE SURFACES OF AT LEAST ONE TRAY IS PARALLEL TO SIDE SURFACE OF TARGET TABLE — S320

CONTROL HEAD UNIT TO STOP ROTATION WHEN FACING DIRECTION OF SENSING UNIT IS PERPENDICULAR TO SIDE SURFACE OF TARGET TABLE — S420

CONTROL AT LEAST ONE TRAY LOADED WITH OBJECT TO EXIT IN DIRECTION FROM SUPPORT UNIT TOWARD TARGET TABLE AFTER MOVEMENT UNIT ARRIVES AT TARGET TABLE — S500

CONTROL AT LEAST ONE TRAY TO ENTER IN DIRECTION FROM TARGET TABLE TOWARD SUPPORT UNIT WHEN OBJECT IS UNLOADED FROM AT LEAST ONE TRAY — S600

CONTROL HEAD UNIT SUCH THAT USER INTERFACE UNIT ROTATES TOWARD SIDE SURFACE OF TARGET TABLE WHEN INFORMATION ABOUT APPROACH OF USER IS OBTAINED THROUGH SENSING UNIT — S700

END

FIG. 16

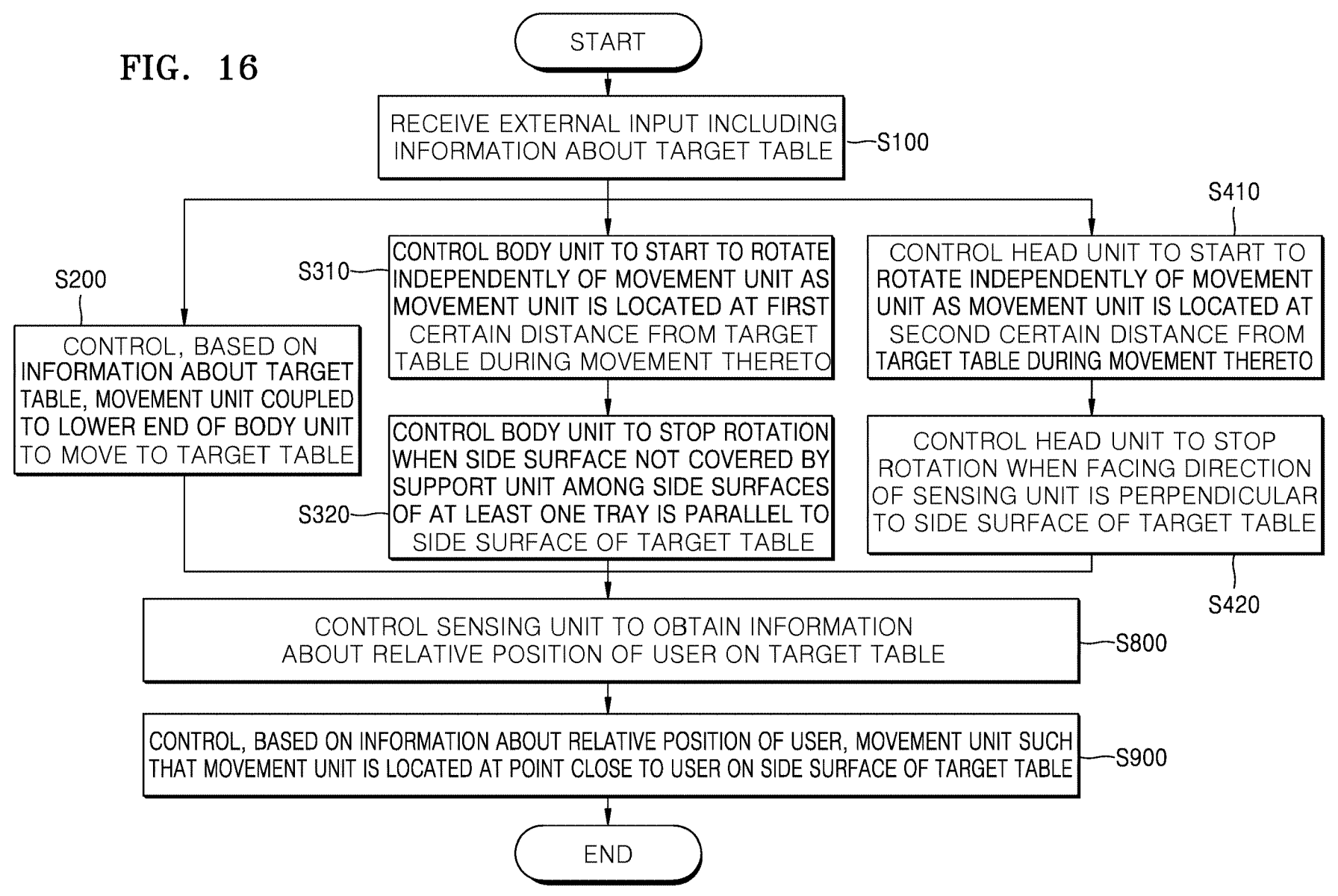

START

RECEIVE EXTERNAL INPUT INCLUDING INFORMATION ABOUT TARGET TABLE —S100

CONTROL, BASED ON INFORMATION ABOUT TARGET TABLE, MOVEMENT UNIT COUPLED TO LOWER END OF BODY UNIT TO MOVE TO TARGET TABLE —S200

CONTROL BODY UNIT TO START TO ROTATE INDEPENDENTLY OF MOVEMENT UNIT AS MOVEMENT UNIT IS LOCATED AT FIRST CERTAIN DISTANCE FROM TARGET TABLE DURING MOVEMENT THERETO —S310

CONTROL HEAD UNIT TO START TO ROTATE INDEPENDENTLY OF MOVEMENT UNIT AS MOVEMENT UNIT IS LOCATED AT SECOND CERTAIN DISTANCE FROM TARGET TABLE DURING MOVEMENT THERETO —S410

CONTROL BODY UNIT TO STOP ROTATION WHEN SIDE SURFACE NOT COVERED BY SUPPORT UNIT AMONG SIDE SURFACES OF AT LEAST ONE TRAY IS PARALLEL TO SIDE SURFACE OF TARGET TABLE —S320

CONTROL HEAD UNIT TO STOP ROTATION WHEN FACING DIRECTION OF SENSING UNIT IS PERPENDICULAR TO SIDE SURFACE OF TARGET TABLE —S420

CONTROL SENSING UNIT TO OBTAIN INFORMATION ABOUT RELATIVE POSITION OF USER ON TARGET TABLE —S800

CONTROL, BASED ON INFORMATION ABOUT RELATIVE POSITION OF USER, MOVEMENT UNIT SUCH THAT MOVEMENT UNIT IS LOCATED AT POINT CLOSE TO USER ON SIDE SURFACE OF TARGET TABLE —S900

END

ROBOT DEVICE AND OPERATING METHOD THEREOF FOR DELIVERING OBJECT TO TARGET TABLE

CROSS-REFERENCE TO RELATED APPLICATION(S)

This application is a continuation application, claiming priority under § 365(c), of an International application No. PCT/KR2023/010024, filed on Jul. 13, 2023, which is based on and claims the benefit of a Korean patent application number 10-2022-0087083, filed on Jul. 14, 2022, in the Korean Intellectual Property Office, the disclosure of which is incorporated by reference herein in its entirety.

TECHNICAL FIELD

The disclosure relates to a robot device and an operating method thereof for delivering an object to a target table. More particularly, the disclosure relates to a robot device and an operating method thereof for accommodating an object and delivering the accommodated object to a set target table.

BACKGROUND ART

Due to the development of robot technology, robot devices may instead perform roles performed by the human. For example, the robot devices may perform cleaning, care for patients, make coffee, sort objects, and deliver food.

Accordingly, there is an increasing demand for robot devices throughout social facilities such as restaurants, cafes, hotels, hospitals, cultural facilities, and public facilities.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Embodiments of the disclosure are to address at least the above-mentioned problems and/or disadvantages and to provide at least the advantages described below. Accordingly, an embodiment of the disclosure is to provide a robot device and operating method thereof for delivering object to target table.

Embodiments will be set forth in part in the description which follows and, in part, will be apparent from the description, or may be learned by practice of the presented embodiments.

An embodiment of the disclosure, a robot device for delivering an object to a target table is provided. The robot device includes a movement unit configured to move the robot device. The robot device includes a body unit coupled to an upper end of the movement unit, the body unit including at least one tray configured to accommodate the object and a support unit configured to support the at least one tray at a certain height. The robot device includes a memory configured to store at least one instruction and at least one processor configured to execute the at least one instruction to receive an external input including information about the target table. The at least one processor may be further configured to control, based on the information about the target table, the movement unit to move to the target table. The at least one processor may be further configured to start to rotate the body unit independently of the movement unit as the movement unit is located at a first certain distance from the target table during movement thereto. The at least one processor may be further configured to stop the rotation of the body unit when a side surface not covered by the support unit among side surfaces of the at least one tray is parallel to a side surface of the target table.

An embodiment of the disclosure, an operating method of a robot device for delivering an object to a target table is provided. The robot device includes a body unit including at least one tray configured to accommodate an object and a support unit configured to support the at least one tray at a certain height. The operating method according to an embodiment of the disclosure includes receiving an external input including information about the target table. The operating method includes controlling, based on the information about the target table, a movement unit coupled to a lower end of the body unit to move to the target table. The operating method includes controlling the body unit to start to rotate independently of the movement unit as the movement unit is located at a first certain distance from the target table during movement thereto. The operating method includes controlling the body unit to stop the rotation when a side surface not covered by the support unit among side surfaces of the at least one tray is parallel to a side surface of the target table.

Other embodiments, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 2 is a diagram for describing a configuration of a robot device according to an embodiment of the disclosure;

FIG. 8A is a conceptual diagram for describing an operating method of a robot device when a movement unit is located at a distance greater than a first certain distance from a target table, according to an embodiment of the disclosure;

FIG. 11 is a flowchart for describing an operating method of a robot device for controlling at least one tray to exit in a direction toward a target table or to enter in a direction toward a support unit, according to an embodiment of the disclosure;

FIG. 14 is a flowchart for describing an operating method of a robot device for rotating a head unit such that a user interface unit may face a side surface of a target table, according to an embodiment of the disclosure;

FIG. 16 is a flowchart for describing an operating method of a robot device for controlling a movement unit to move to a point close to a user at a target table, according to an embodiment of the disclosure.

The same reference numerals are used to represent the same elements throughout the drawings.

MODE OF DISCLOSURE

Figure 1A:
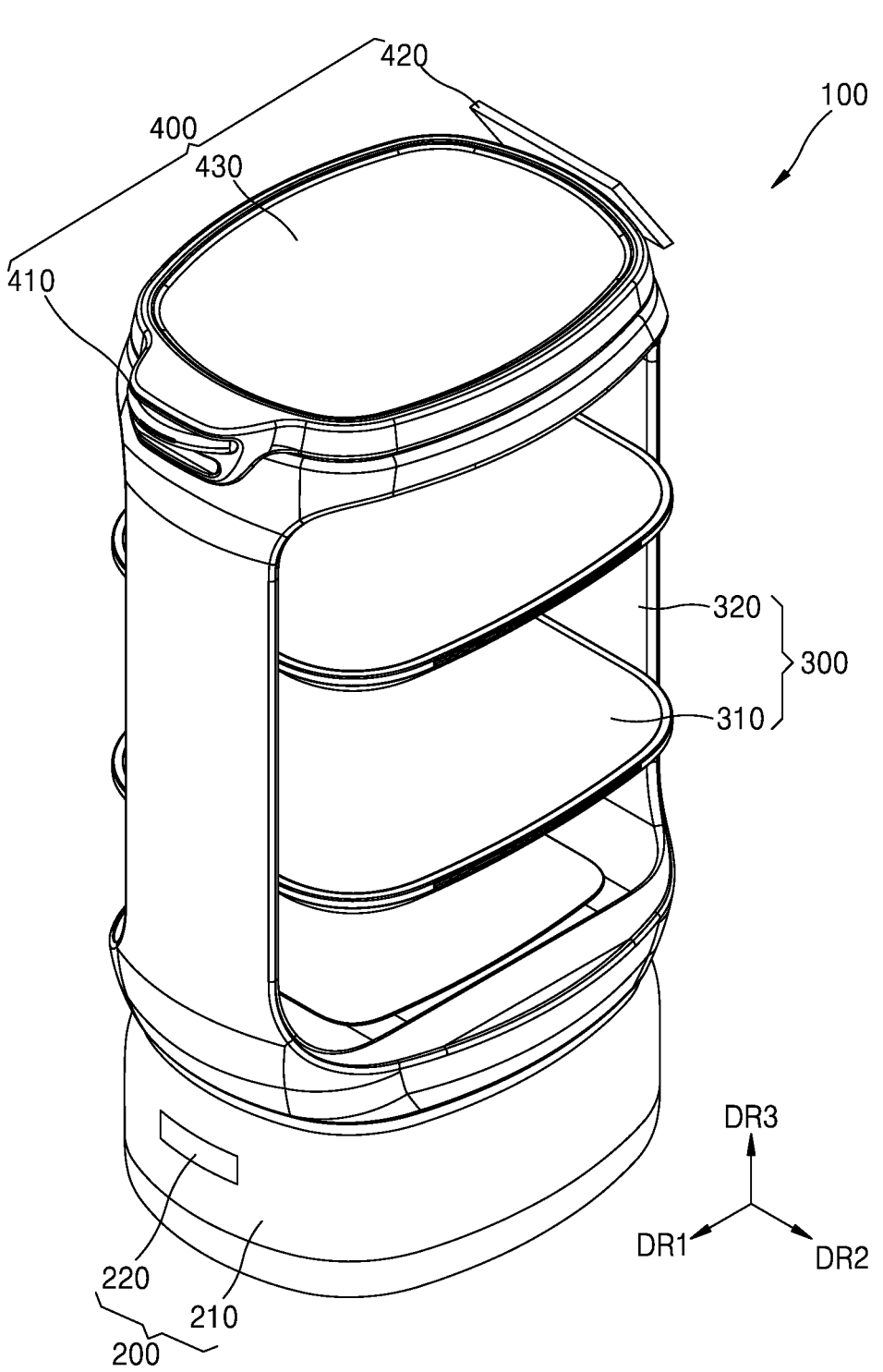
FIG. 1A is a diagram for describing a robot device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Terms used herein will be briefly described and then an embodiment of the disclosure will be described in detail.

The terms used herein are those general terms currently widely used in the art in consideration of functions in an embodiment of the disclosure, but the terms may vary according to the intentions of those of ordinary skill in the art, precedents, or new technology in the art. Also, in some cases, there may be terms that are optionally selected by the applicant, and the meanings thereof will be described in detail in the corresponding embodiment of the disclosure. Thus, the terms used herein should be understood not as simple names but based on the meanings of the terms and the overall description of the disclosure.

Unless otherwise defined, all terms (including technical or scientific terms) used herein may have the same meanings as commonly understood by those of ordinary skill in the art of the disclosure.

Throughout the disclosure, when something is referred to as "including" an element, one or more other elements may be further included unless specified otherwise. Also, as used herein, the terms such as "units" and "modules" may refer to units that perform at least one function or operation, and the units may be implemented as hardware or software or a combination of hardware and software.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" in a hardware level. Instead, in some case, the expression "a system configured to . . . " may mean that the system is "capable of . . . " along with other devices or components. For example, "a processor configured to (or set to) perform A, B, and C" may refer to a dedicated processor (e.g., an embedded processor) for performing a corresponding operation, or a general-purpose processor (e.g., a central processing unit (CPU) or an application processor) capable of performing a corresponding operation by executing one or more software programs stored in a memory.

Also, herein, when an element is referred to as being "connected" or "coupled" to another element, the element may be directly connected or coupled to the other element and may also be connected or coupled to the other element through one or more other intervening elements therebetween unless otherwise specified.

Hereinafter, an embodiment of the disclosure will be described in detail with reference to the accompanying drawings so that those of ordinary skill in the art may easily implement the disclosure. However, an embodiment of the disclosure may be embodied in many different forms and should not be construed as being limited to the embodiment set forth herein. Also, portions irrelevant to the description of an embodiment of the disclosure will be omitted in the drawings for a clear description of the disclosure, and like reference numerals will denote like elements throughout the disclosure.

Herein, an "object" may refer to a target object to be delivered by using a robot device. The object may be a target object that may be accommodated in the robot device. For example, the object may include food, boxes, and the like; however, the disclosure is not limited to thereto.

Herein, a "target table" may refer to a destination to which the object is to be delivered by using the robot device. As an example of the disclosure, the shape of the target table may include a rectangular shape, a circular shape, and the like; however, the disclosure is not limited thereto. As an example of the disclosure, the "target table" may be a term selected to describe the disclosure, and the destination to which the object of the disclosure is to be delivered may include not only a table but also a particular place, a storage tray, a person, and the like.

Hereinafter, an embodiment of the disclosure will be described in detail with reference to the accompanying drawings so that those of ordinary skill in the art may easily implement the disclosure. However, the disclosure may be embodied in many different forms and should not be construed as being limited to the embodiment set forth herein.

Hereinafter, an embodiment of the disclosure will be described in detail with reference to the accompanying drawings.

FIG. 1A is a diagram for describing a robot device according to an embodiment of the disclosure.

Figure 5:
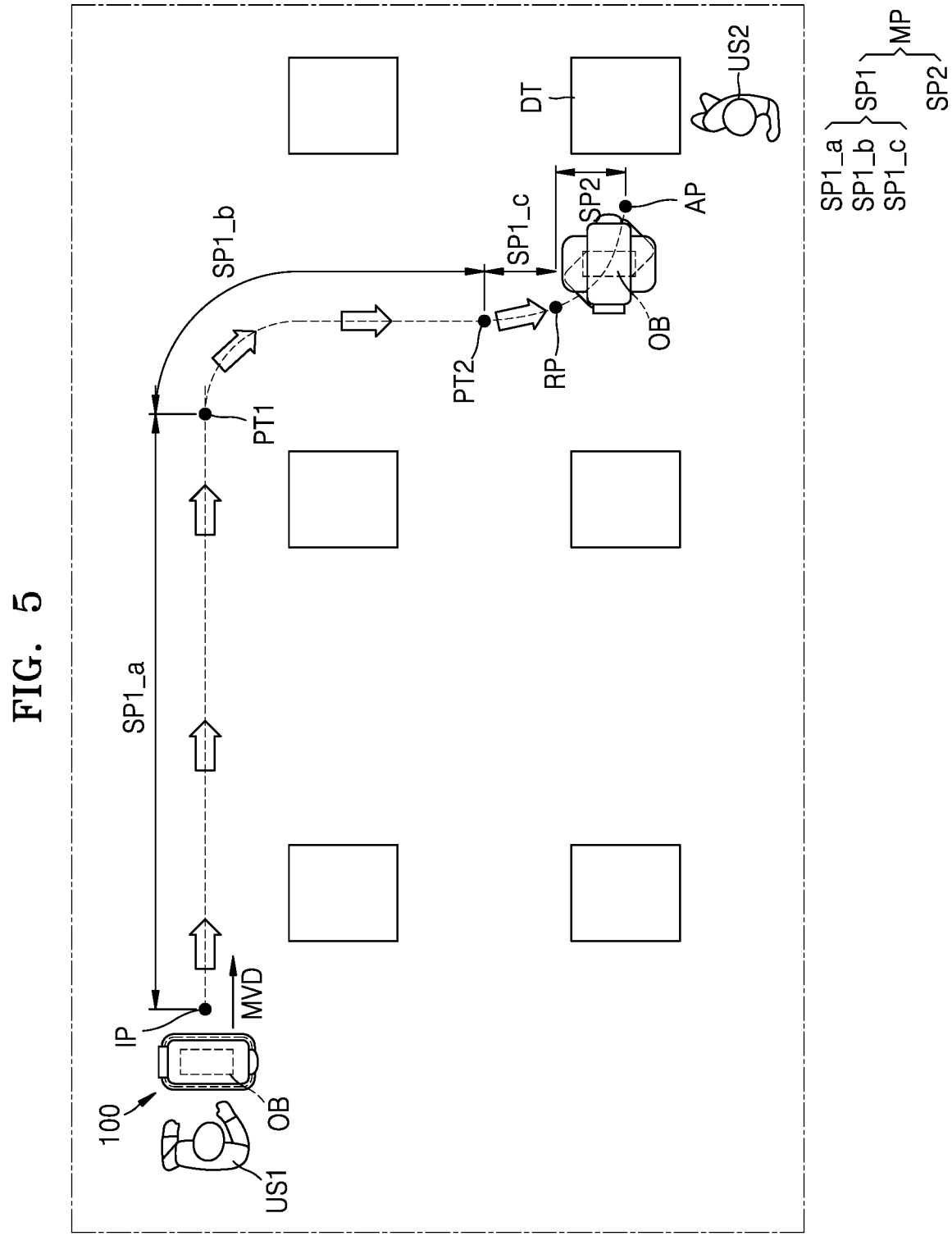
FIG. 5 is a conceptual diagram for describing an operation of a robot device according to an embodiment of the disclosure.

Referring to FIG. 1A, a robot device 100 according to an embodiment of the disclosure may accommodate an object (OB) (see FIG. 2) and deliver the accommodated object OB to a target table DT (see FIG. 5).

In an embodiment of the disclosure, the robot device 100 may include a movement unit 200 for moving the robot device 100, a body unit 300 coupled to an upper end of the movement unit 200, and a head unit 400 coupled to an upper end of body unit 300. However, not all of the components illustrated in FIG. 1A are necessary components. The robot device 100 may include more components than those illustrated in FIG. 1A or may include fewer components than those illustrated in FIG. 1A. For example, the robot device 100 may further include a first connection portion (CP) (see FIG. 2) between the movement unit 200 and the body unit 300 and a second connection portion (not illustrated) between the body unit 300 and the head unit 400. An embodiment in which the robot device 100 further includes the first connection portion CP and the second connection portion will be described below with reference to FIG. 2.

The robot device 100 may further include a memory 500 (see FIG. 3) storing one or more instructions and at least one processor 600 (see FIG. 3) executing the one or more instructions stored in the memory 500. Also, an embodiment in which the robot device 100 further includes the memory 500 and the at least one processor 600 will be described below with reference to FIG. 3.

In an embodiment of the disclosure, the body unit 300 may include at least one tray 310 capable of accommodating the object OB and a support unit 320 supporting the at least one tray 310 such that the at least one tray 310 may be located at a certain height. FIG. 1A illustrates that the body unit 300 includes two trays; however, the disclosure is not limited thereto. The body unit 300 may include one tray 310 or may include three or more trays.

FIG. 1A illustrates that the support unit 320 supports the at least one tray 310 on two side surfaces facing each other among the side surfaces of the at least one tray 310; however, the disclosure is not limited thereto. The support unit 320 may support the at least one tray 310 on one side surface among the side surfaces of the at least one tray 310 or may support the at least one tray 310 on three or more side surfaces among the side surface of the at least one tray 310.

Also, FIG. 1A illustrates that the interval between the at least one tray 310 supported by the support unit 320 is uniform; however, the disclosure is not limited thereto. The interval between the at least one tray 310 supported by the support unit 320 may vary depending on the type, shape, and size of the object OB to be delivered through the robot device 100. Also, the at least one tray 310 supported by the support unit 320 may move in a direction toward the movement unit 200 or the head unit 400 and thus the interval between the at least one tray 310 may change. An embodiment in which the at least one tray 310 moves in a direction toward the movement unit 200 or the head unit 400 will be described below with reference to FIGS. 12A and 12B.

In an embodiment of the disclosure, the head unit 400 may include a sensing unit 410 sensing an object around the robot device 100, a user interface unit 420 receiving an external input including information about the target table DT, and a head body 430 where the sensing unit 410 and the user interface unit 420 are arranged. In an embodiment of the disclosure, the sensing unit 410 may include a red green blue (RGB) camera for obtaining an RGB image around the robot device 100, a red green blue-depth (RGBD) camera for obtaining a depth image, a light-detecting and ranging (LiDAR) for measuring a distance by using a laser, a time-of-flight (ToF) sensor, and a motion sensor; however, the disclosure is not limited thereto.

The sensing unit 410 may sense an object around the robot device 100 while the robot device 100 moves to the target table DT and may sense an object around the robot device 100 after the robot device 100 arrives at the target table DT.

The user interface unit 420 may receive an external input including information about the target table DT from a user US1 (see FIG. 5; hereinafter referred to as a first user) loading the object OB into the robot device 100. However, the disclosure is not limited thereto. The user interface unit 420 may receive an external input from a user US2 (see FIG. 5; hereinafter referred to as a second user) unloading the object OB accommodated in the robot device 100 or from a user (not illustrated) located around while the robot device 100 moves to the target table DT.

FIG. 1A illustrates that the sensing unit 410 and the user interface unit 420 are respectively arranged on two side surfaces facing each other among the side surfaces of the head body 430; however, the disclosure is not limited thereto. The sensing unit 410 and the user interface unit 420 may be arranged together on any one side surface among the side surfaces of the head body 430 or may be respectively arranged on two side surfaces contacting each other among the side surfaces of the head body 430.

In an embodiment of the disclosure, the movement unit 200 may include a movement body 210 and a movement sensor unit 220 for obtaining a movement path (MP) (see FIG. 5) for moving to the target table DT.

The movement sensor unit 220 may include an RGB camera for obtaining an RGB image, an RGBD camera for obtaining a depth image, a LiDAR for measuring a distance by using a laser, and a ToF sensor; however, the disclosure is not limited thereto. Based on the information about the target table DT received through the user interface unit 420, the movement sensor unit 220 may sense whether an obstacle is present on the movement path MP for moving to the target table DT. However, the disclosure is not limited thereto, and the sensing unit 410 included in the head unit 400 may also sense whether an obstacle is present on the movement path MP.

When the presence of an obstacle on the movement path MP is sensed through the movement sensor unit 220, the movement unit 200 may stop movement until it is identified that the obstacle has disappeared or may return to and move on the original movement path MP after avoiding the obstacle.

In an embodiment of the disclosure, when the front of the movement sensor unit 220 is referred to as a movement direction (MVD) (see FIG. 8A) of the movement unit 200, FIG. 1A illustrates that a side surface TS1 (see FIG. 2) covered by the support unit 320 and among the side surfaces of the at least one tray 310 and the movement direction MVD of the movement unit 200 are parallel to each other. However, the disclosure is not limited thereto. A side surface TS2 (see FIG. 2) not covered by the support unit 320 among the side surfaces of the at least one tray 310 and the movement direction MVD of the movement unit 200 may be parallel to each other. An embodiment thereof will be described below with reference to FIGS. 10A and 10B.

Also, FIG. 1A illustrates that the front surface of the sensing unit 410 and the movement direction MVD of the movement unit 200 are parallel to each other. As an example of the disclosure, the robot device 100 may move in a state where the front surface of the sensing unit 410 and the movement direction MVD of the movement unit 200 are parallel to each other.

Figure 1B:
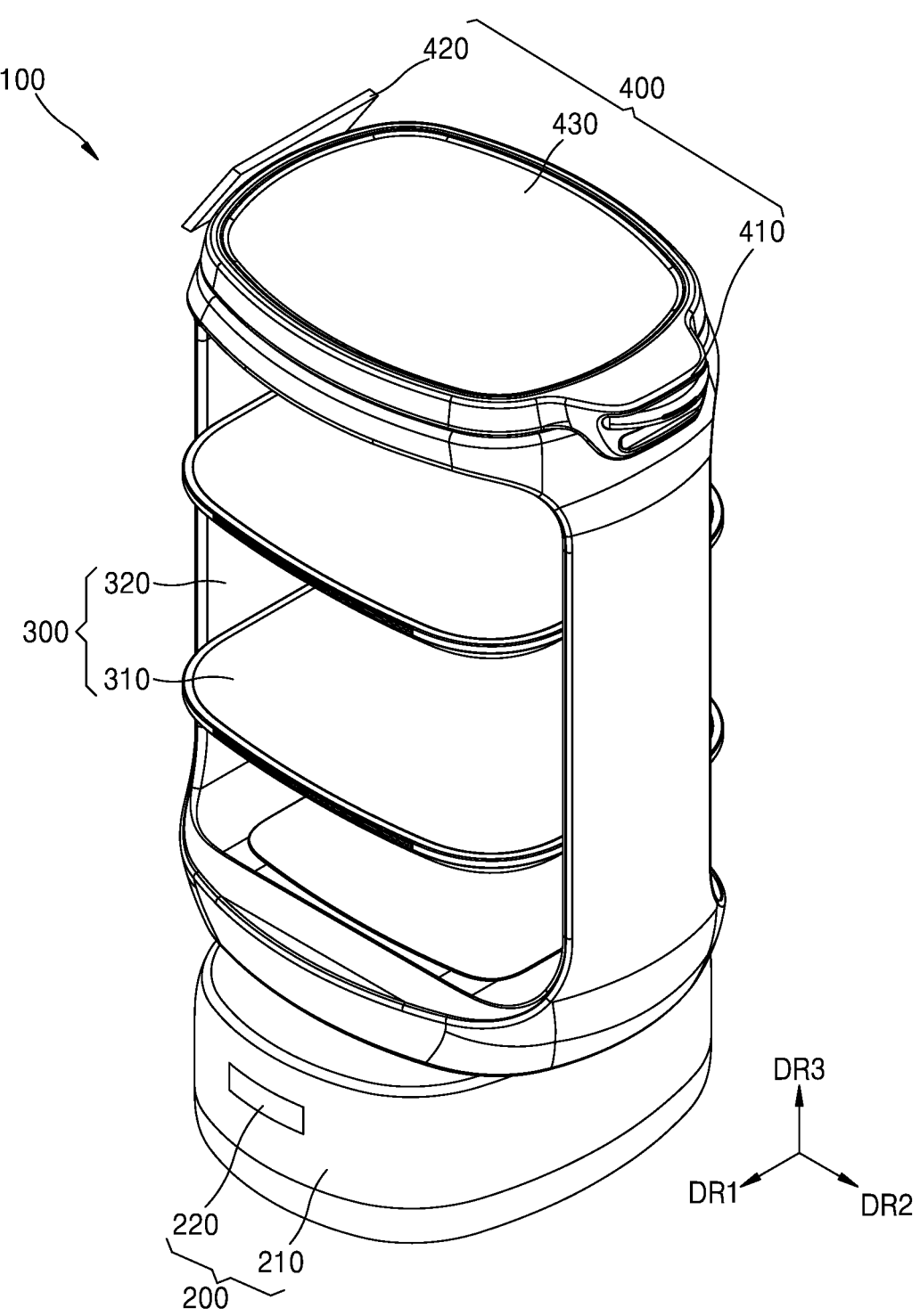
FIG. 1B is a diagram for describing a robot device according to an embodiment of the disclosure.

FIG. 1B is a diagram for describing a robot device according to an embodiment of the disclosure.

Hereinafter, like reference numerals will be assigned to like components described above with reference to FIG. 1A, and redundant descriptions thereof will be omitted for conciseness.

Referring to FIG. 1B, in an embodiment of the disclosure, the body unit 300 may rotate independently of the movement unit 200. The body unit 300 may rotate to the same degree as the movement unit 200 while the movement unit 200 moves to the target table DT (see FIG. 5) along the movement path MP (see FIG. 5). However, the disclosure is not limited thereto. The body unit 300 may rotate to a greater degree than the movement unit 200 while the movement unit 200 moves to the target table DT.

Referring to FIGS. 1A and 1B, FIG. 1A illustrates that the side surface TS1 (see FIG. 2) covered by the support unit 320 among the side surfaces of the at least one tray 310 and the movement direction MVD of the movement unit 200 are parallel to each other. On the other hand, FIG. 1B illustrates that the body unit 300 rotates independently of the movement unit 200 and thus the side surface TS1 covered by the support unit 320 among the side surfaces of the at least one tray 310 and the movement direction MVD of the movement unit 200 intersect each other. However, the disclosure is not limited thereto. In an embodiment of the disclosure, although the movement unit 200 also rotates, the rotation amount of the body unit 300 and the rotation amount of the movement unit 200 may be different from each other. Thus, the side surface TS1 covered by the support unit 320 among the side surfaces of the at least one tray 310 and the movement direction MVD of the movement unit 200 may intersect each other.

In an embodiment of the disclosure, the head unit 400 may rotate independently of each of the movement unit 200 and the body unit 300. The head unit 400 may rotate to the same degree as the movement unit 200 while the movement unit 200 moves to the target table DT along the movement path MP. However, the disclosure is not limited thereto. The head unit 400 may rotate to a greater degree than the movement unit 200 while the movement unit 200 moves to the target table DT. Also, FIGS. 1A and 1B illustrate that the rotation amount of the head unit 400 and the rotation amount of the body unit 300 are equal to each other; however, the disclosure is not limited thereto. The rotation amount of the head unit 400 and the rotation amount of the body unit 300 may be different from each other. Also, the rotation direction of the head unit 400 and the rotation direction of the body unit 300 may be different from each other.

Figure 2:
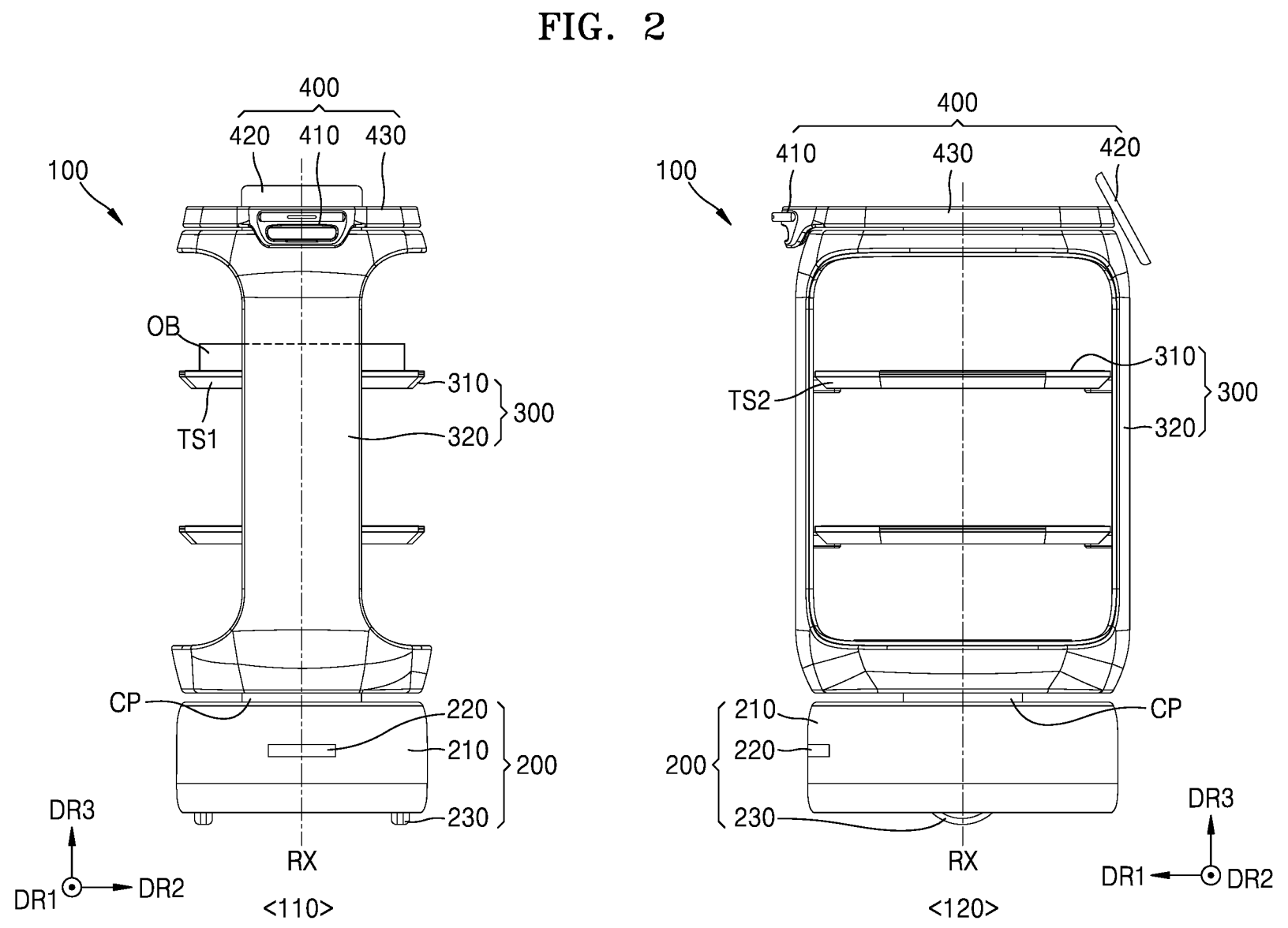

FIG. 2 is a diagram for describing a configuration of a robot device according to an embodiment of the disclosure.

Hereinafter, like reference numerals will be assigned to like components described above with reference to FIG. 1A, and redundant descriptions thereof will be omitted for conciseness.

Referring to FIG. 2, when the front of the movement sensor unit 220 is referred to as the front of the robot device 100, a front view 110 of the robot device 100 and a side view 120 of the robot device 100 are illustrated to describe the configuration of the robot device 100.

In an embodiment of the disclosure, the object OB may be loaded on the at least one tray 310. The front and side views 110 and 120 of FIG. 2 illustrate that the body unit 300 includes two trays 310 and the object OB is loaded on one of the two trays 310; however, the disclosure is not limited thereto. The object OB may be loaded on each of the two trays 310. Also, the object OB may be loaded on the head body 430 of the head unit 400.

In an embodiment of the disclosure, the robot device 100 may include a first connection portion CP connecting the movement unit 200 with the body unit 300. The body unit 300 may rotate around a rotation axis (RX) independently of the movement unit 200. FIG. 2 illustrates that the robot device 100 includes the first connector CP; however, the disclosure is not limited thereto. The robot device 100 may further include a second connection portion connecting the body unit 300 with the head unit 400. The head unit 400 may rotate around the rotation axis RX independently of the body unit 300 and the movement unit 200. In an embodiment of the disclosure, the body unit 300 and the head unit 400 may rotate around different rotation axes.

In an embodiment of the disclosure, the movement unit 200 may include a movement assembly 230. FIG. 2 illustrates that the movement unit 200 includes the movement assembly 230 including two wheels; however, the disclosure is not limited thereto. The movement assembly 230 may include one wheel or three or more wheels. Also, the movement assembly 230 may include rollers, rails, and/or the like but is not limited thereto.

In an embodiment of the disclosure, the at least one tray 310 may include a side surface TS1 covered by the support unit 320 and a side surface TS2 not covered by the support unit 320. The object OB may be loaded onto or unloaded from the at least one tray 310 in the direction of the side surface TS2 not covered by the support unit 320.

When the robot device 100 moves with the side surface TS1 covered by the support unit 320 as the front surface, the object OB accommodated in the at least one tray 310 may also move in a state of being covered by the support unit 320. Thus, when the robot device 100 moves, an area exposed to the outside among the entire area of the object OB accommodated in the at least one tray 310 may be reduced. Also, the object OB accommodated in the at least one tray 310 may be protected from an impact or the like that the robot device 100 may receive from the outside during the movement thereof.

Also, referring to the front and side views 110 and 120 of FIG. 2, the robot device 100 may have a shape in which the length of the side surface TS2 of the at least one tray 310 not covered by the support unit 320 is greater than the length of the side surface TS1 of the at least one tray 310 covered by the support unit 320. Thus, when moving with the side surface TS1 covered by the support unit 320 as the front surface, the robot device 100 may move through a narrow area relatively easily compared to when moving with the side surface TS2 not covered by the support unit 320 as the front surface.

However, the disclosure is not limited thereto, and the length of the side surface TS1 of the at least one tray 310 covered by the support unit 320 and the side surface TS2 of the at least one tray 310 not covered by the support unit 320 may be equal to each other. Also, the length of the side surface TS1 of the at least one tray 310 covered by the support unit 320 may be greater than the length of the side surface TS2 of the at least one tray 310 not covered by the support unit 320.

In an embodiment of the disclosure, depending on the shape of the robot device 100, the robot device 100 may move with any one side surface among the side surface TS1 of the at least one tray 310 covered by the support unit 320 and the side surface TS2 of the at least one tray 310 not covered by the support unit 320 as the front surface.

As an embodiment of the disclosure, FIG. 1A illustrates that the support unit 320 supports the at least one tray 310 on two side surfaces facing each other among the side surfaces of the at least one tray 310; however, the disclosure is not limited thereto.

The support unit 320 may support the at least one tray 310 on any one side surface among a relatively long side surface and a relatively short side surface among the side surfaces of the at least one tray 310. When the support unit 320 supports the at least one tray 310 on a relatively long side surface among the side surfaces of the at least one tray 310, the robot device 100 may move with the side surface covered by the support unit 320 as the front surface in order to minimize the exposure of the object OB accommodated in the at least one tray 310 to the outside during the movement thereof. Also, the robot device 100 may move with the side surface not covered by the support unit 320 as the front surface in order to relatively easily move through a narrow area.

Similarly, even when the support unit 320 supports the at least one tray 310 on a relatively short side surface among the side surfaces of the at least one tray 310, the robot device 100 may also move with the side surface covered by the support unit 320 or the side surface not covered by the support unit 320 as the front surface.

Figure 3:
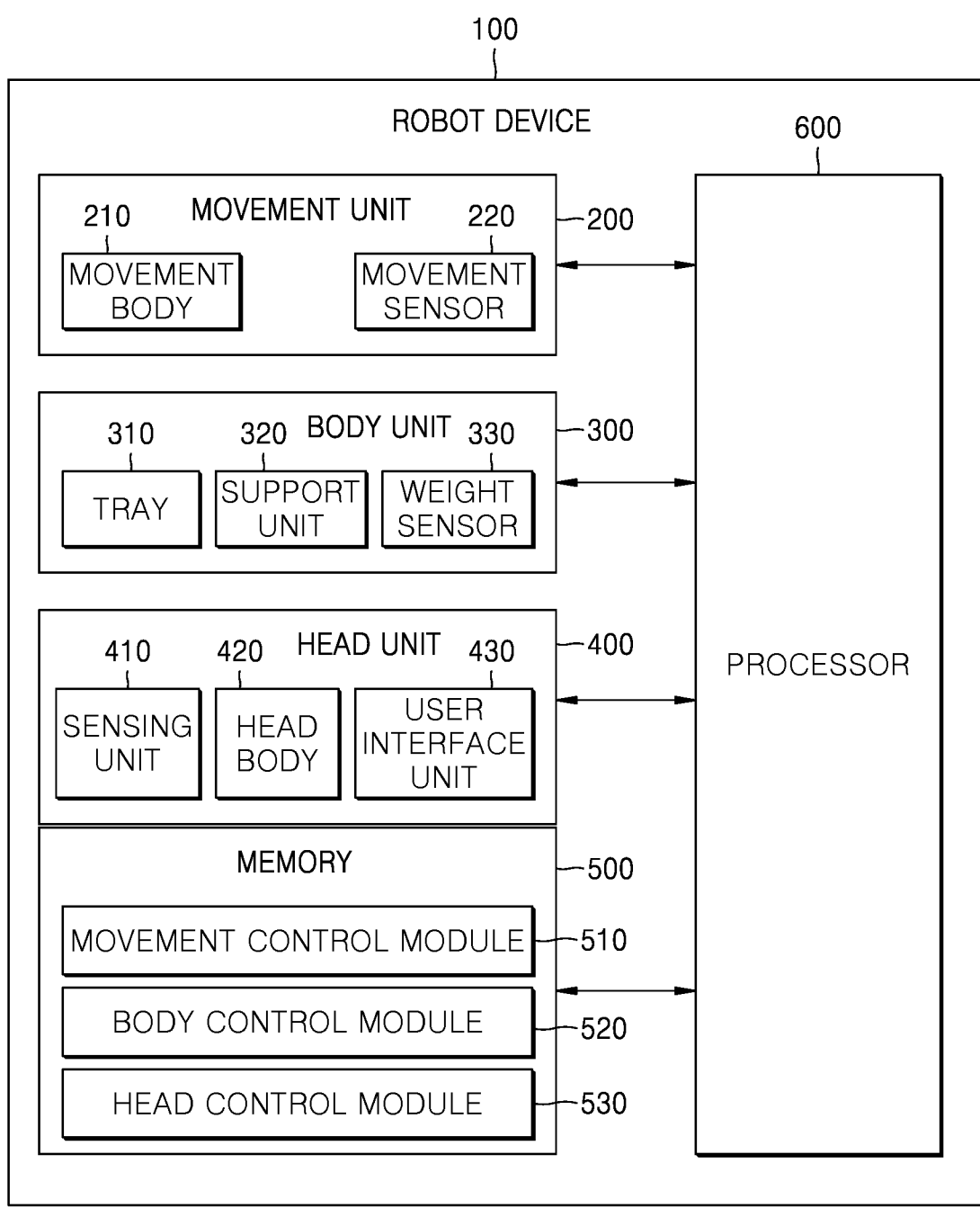
FIG. 3 is a block diagram for describing a robot device according to an embodiment of the disclosure.

FIG. 3 is a block diagram for describing a robot device according to an embodiment of the disclosure.

Referring to FIG. 3, a robot device 100 according to an embodiment of the disclosure may include a movement unit

200, a body unit 300, a memory 500, and a processor 600. However, not all of the components illustrated in FIG. 3 are necessary components. The robot device 100 may be implemented by more components or by fewer components than those illustrated in FIG. 3. As illustrated in FIG. 3, a robot device 100 according to an embodiment of the disclosure may include a movement unit 200, a body unit 300, a head unit 400, a memory 500, and a processor 600. The movement unit 200, the body unit 300, the head unit 400, the memory 500, and the processor 600 may be electrically and/or physically connected to each other. Hereinafter, like reference numerals will be assigned to like components described above with reference to FIGS. 1A to 2, and redundant descriptions thereof will be omitted for conciseness.

In an embodiment of the disclosure, the body unit 300 may further include a weight sensor 330. At least one processor 600 may measure a weight corresponding to the at least one tray 310 (see FIG. 2) through the weight sensor 330. As an example of the disclosure, the weight sensor 330 may obtain the weight of the at least one tray 310 and the object OB (see FIG. 2) arranged on the at least one tray 310.

In an embodiment of the disclosure, the memory 500 may include at least one of flash memory type, hard disk type, multimedia card micro type, card type memory (e.g., secure digital (SD) or eXtreme digital (XD) memory), random-access memory (RAM), static random-access memory (SRAM), read-only memory (ROM), electrically erasable programmable read-only memory (EEPROM), programmable read-only memory (PROM), mask ROM, flash ROM, hard disk drive (HDD), or solid state drive (SSD). Instructions or program codes for performing functions or operations of the robot device 100 may be stored in the memory 500. Instructions, algorithms, data structures, program codes, and application programs stored in memory 500 may be implemented in programming or scripting languages such as C, C++, Java, and Assembler.

In an embodiment of the disclosure, the memory 500 may store various types of modules that may be used to deliver the object OB (see FIG. 5) to the target table DT (see FIG. 5). A movement control module 510, a body control module 520, and a head control module 530 may be stored in the memory 500. The "module" included in the memory 500 may refer to a unit for processing a function or operation performed by the processor 600. The "module" included in the memory 500 may be implemented as software such as instructions, algorithms, data structures, or program codes.

In an embodiment of the disclosure, the movement control module 510 may include instructions or program codes related to an operation of moving the robot device 100 to the target table DT through the movement unit 200. The movement control module 510 will be described below with reference to FIGS. 4, 5, 15, and 16.

In an embodiment of the disclosure, the body control module 520 may include instructions or program codes related to an operation of the body unit 300 while the movement unit 200 moves to the target table DT. The body control module 520 will be described below with reference to FIGS. 5 to 14.

In an embodiment of the disclosure, the head control module 530 may include instructions or program codes related to an operation of the head unit 400 while the movement unit 200 moves to the target table DT. The head control module 530 will be described below with reference to FIGS. 7 to 15.

In an embodiment of the disclosure, the processor 600 may include, but is not limited to, at least one of a central processing unit, a microprocessor, a graphic processing unit, an application processor (AP), application specific integrated circuits (ASICs), digital signal processors (DSPs), digital signal processing devices (DSPDs), programmable logic devices (PLDs), field programmable gate arrays (FP-GAs), a neural processor (neural processing unit), or an artificial intelligence (AI) dedicated processor designed with a hardware structure specialized for learning and processing by an AI model.

Figure 4:
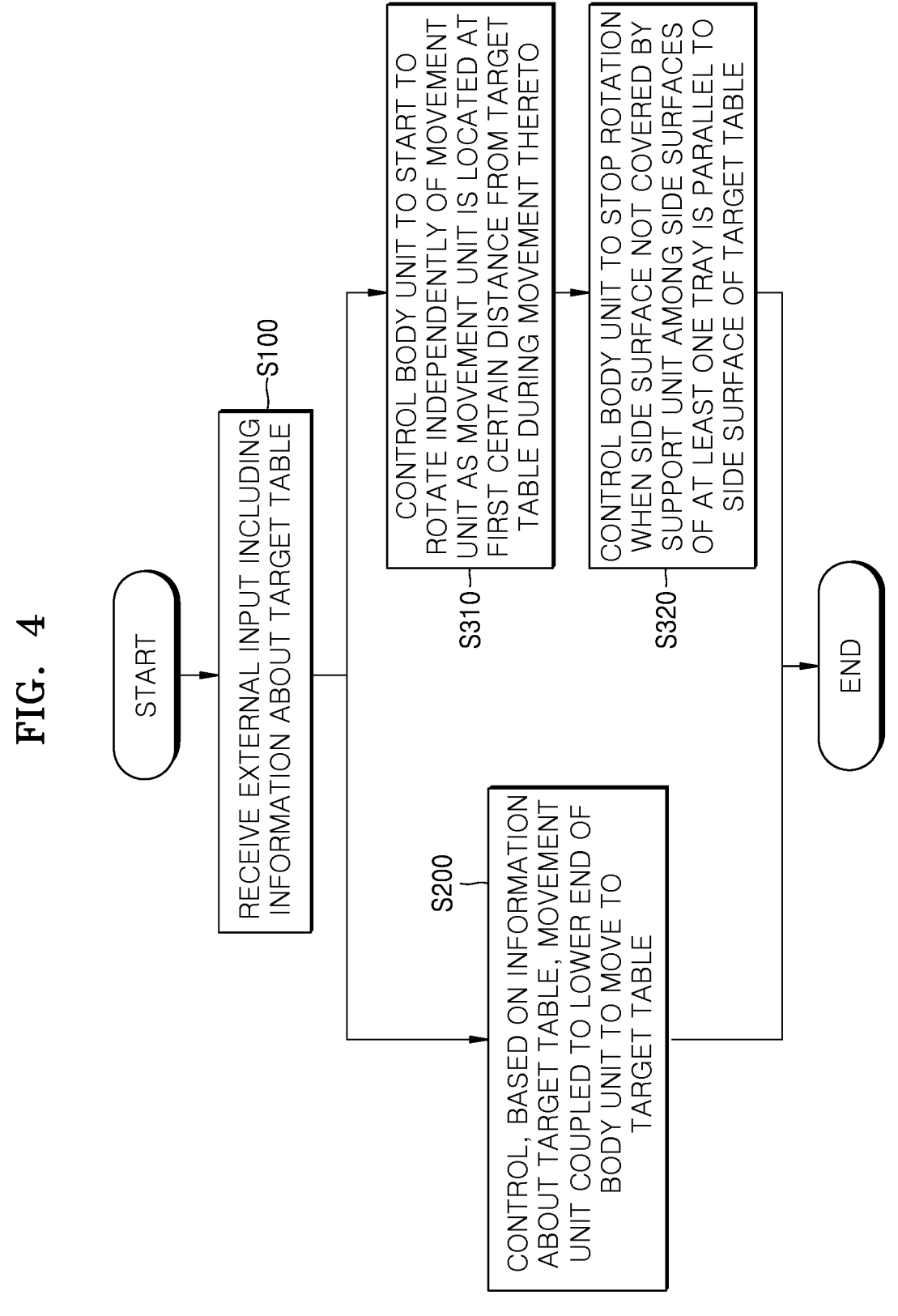
FIG. 4 is a flowchart for describing an operating method of a robot device according to an embodiment of the disclosure.

FIG. 4 is a flowchart for describing an operation of a robot device according to an embodiment of the disclosure.

FIG. 5 is a conceptual diagram for describing an operation of a robot device according to an embodiment of the disclosure.

Referring to FIGS. 1A, 4, and 5, in an embodiment of the disclosure, the operating method of a robot device 100 may include receiving an external input including information about the target table DT at operation S100. In an embodiment of the disclosure, the external input may be provided by the first user US1 intending to deliver the object OB to the target table DT through the robot device 100. In an embodiment of the disclosure, the at least one processor 600 (see FIG. 3) may receive an external input including information about the target table DT.

In an embodiment of the disclosure, when a place where the robot device 100 receives the external input is defined as an input point (IP) and a point where the movement unit 200 arrives at the target table DT is defined as an arrival point AP, the information about the target table DT may include distance information from the input point IP to the arrival point AP, position information of the target table DT, and/or identification information of the target table DT. Also, the external input may further include information such as a speed limit of the movement unit 200 moving to the target table DT and a target time taken to arrive at the target table DT.

In an embodiment of the disclosure, the operating method of the robot device 100 may include controlling, based on the information about the target table DT, the movement unit 200 coupled to the lower end of the body unit 300 to move to the target table DT at operation S200. In an embodiment of the disclosure, the at least one processor 600 may control, based on the information about the target table DT, the movement unit 200 to move to the target table DT.

In an embodiment of the disclosure, the robot device 100 may obtain, based on the information about the target table DT, the movement path MP along which the movement unit 200 moves from the input point IP to the arrival point AP. In an embodiment of the disclosure, the robot device 100 may obtain the movement path MP by using the movement control module 510 (see FIG. 3).

In an embodiment of the disclosure, the movement path MP may include a first point PT1, a second point PT2, and a body rotation point (RP). Each of the first point PT1 and the second point PT2 may be a point where the movement unit 200 starts to change the movement direction MVD while moving along the movement path MP. The body rotation point RP may be a point located at a first certain distance from the target table DT and may be a point where the body unit 300 starts to rotate independently of the movement unit 200.

In an embodiment of the disclosure, the movement path MP may include a first movement path SP1 from the input point IP to the body rotation point RP and a second movement path SP2 from the body rotation point RP to the arrival point AP. The first movement path SP1 may include a first sub movement path SP1_a from the input point IP to the first point PT1, a second sub movement path SP1_b from the first point PT1 to the second point PT2, and a third sub movement path SP1_c from the second point PT2 to the body rotation point RP.

In an embodiment of the disclosure, FIG. 5 illustrates that the movement path MP includes the first point PT1 and the second point PT2; however, the disclosure is not limited thereto. As the position of the target table DT is changed, the movement path MP may include one point where the movement direction MVD is changed or may include three or more points where the movement direction MVD is changed.

In an embodiment of the disclosure, the path of the movement unit 200 for moving the robot device 100 is illustrated in FIG. 5. FIG. 5 illustrates that the movement unit 200 moves to the target table DT while changing the movement direction MVD in a curved shape at the first point PT1 and the second point PT2; however, the disclosure is not limited thereto. The movement unit 200 may move toward the target table DT after changing the movement direction MVD to a particular angle such as 30 degrees, 45 degrees, 60 degrees, or 90 degrees at least one of the first point PT1 or the second point PT2.

In an embodiment of the disclosure, the operating method of the robot device 100 may include controlling the body unit 300 to start to rotate independently of the movement unit 200 as the movement unit 200 is located at a first certain distance from the target table DT during the movement thereto at operation S310. In an embodiment of the disclosure, the at least one processor 600 may start to rotate the body unit 300 independently of the movement unit 200 as the movement unit 200 is located at a first certain distance from the target table DT during the movement thereto.

In an embodiment of the disclosure, the robot device 100 may obtain, based on the information about the target table DT, the body rotation point RP located at a first certain distance from the target table DT, at which the body unit 300 starts to rotate independently of the movement unit 200. In an embodiment of the disclosure, the robot device 100 may obtain the body rotation point RP by using the body control module 520 (see FIG. 3). In an embodiment of the disclosure, the robot device 100 may obtain the body rotation point RP based on the movement path MP and/or the like. Particularly, the robot device 100 may obtain the body rotation point RP based on whether the movement path MP is changed into a curved shape at the first point PT1 and the second point PT2 or whether the movement path MP is changed to a particular angle at least one of the first point PT1 or the second point PT2.

Also, in an embodiment of the disclosure, the robot device 100 may obtain the body rotation point RP based on information about the body unit 300. In an embodiment of the disclosure, the robot device 100 may obtain the body rotation point RP based on the rotation speed and/or the like of the body unit 300. Particularly, when the rotation speed of the body unit 300 rotating independently of the movement unit 200 is high, the robot device 100 may obtain the body rotation point RP having a first certain distance from the target table DT, which is relatively close thereto. On the other hand, when the rotation speed of the body unit 300 rotating independently of the movement unit 200 is low, the robot device 100 may obtain the body rotation point RP having a first certain distance from the target table DT, which is relatively distant therefrom.

Also, in an embodiment of the disclosure, the robot device 100 may obtain the body rotation point RP based on information about the type and/or the like of the object OB accommodated in the at least one tray 310. In an embodiment of the disclosure, when the object OB accommodated in the at least one tray 310 includes a liquid, the robot device 100 may reduce the rotation speed of the body unit 300 in order to prevent the liquid included in the object OB from overflowing and may obtain the body rotation point RP having a first certain distance from the target table DT, which is relatively distant therefrom.

In an embodiment of the disclosure, the robot device 100 may receive an external input including information about the type or the like of the object OB through the user interface unit 420. In an embodiment of the disclosure, the robot device 100 may further include a separate sensing unit for sensing information about the type of the object OB accommodated in the at least one tray 310 and may obtain information about the type or the like of the object OB through the sensing unit.

In an embodiment of the disclosure, the operating method of the robot device 100 may include controlling the body unit 300 to stop the rotation when the side surface TS2 (see FIG. 2) not covered by the support unit 320 among the side surfaces of the at least one tray 310 is parallel to the side surface (SF) of the target table DT at operation S320. In an embodiment of the disclosure, the at least one processor 600 may stop the rotation of the body unit 300 when the side surface TS2 not covered by the support unit 320 among the side surfaces of the at least one tray 310 is parallel to the side surface SF of the target table DT. In an embodiment of the disclosure, among the side surfaces of the target table DT, a side surface parallel to the side surface TS2 not covered by the support unit 320 among the side surfaces of the at least one tray 310 may be the side surface SF closest to the robot device 100.

However, the disclosure is not limited thereto. In an embodiment of the disclosure, the operating method of the robot device 100 may include controlling the body unit 300 to stop the rotation when the direction perpendicular to the side surface TS2 not covered by the support unit 320 among the side surfaces of the at least one tray 310 is parallel to the direction perpendicular to the point on the target table DT closest to the robot device 100 at operation S320. In an embodiment of the disclosure, the at least one processor 600 may stop the rotation of the body unit 300 when the direction perpendicular to the side surface TS2 not covered by the support unit 320 among the side surfaces of the at least one tray 310 is parallel to the direction perpendicular to the point on the target table DT closest to the robot device 100.

In an embodiment of the disclosure, the at least one processor 600 may control the rotation of the body unit 300 such that the body unit 300 may start to rotate independently of the movement unit 200 at the body rotation point RP and the side surface TS2 not covered by the support unit 320 among the side surfaces of the at least one tray 310 may be parallel to the side surface SF of the target table DT when the movement unit 200 arrives at the arrival point AP. However, the disclosure is not limited thereto. In an embodiment of the disclosure, the at least one processor 600 may control the rotation of the body unit 300 such that the body unit 300 may start to rotate independently of the movement unit 200 at the body rotation point RP, the side surface TS2 not covered by the support unit 320 among the side surfaces of the at least one tray 310 may be parallel to the side surface SF of the target table DT before the movement unit 200 arrives at the arrival point AP, and the movement unit 200 may arrive at the arrival point AP while maintaining the parallel state.

In an embodiment of the disclosure, on the target table DT, in order for the second user US2 to unload the object OB (see FIG. 2) accommodated in the at least one tray 310, the side surface TS2 not covered by the support unit 320 among the side surfaces of the at least one tray 310 should be parallel to the side surface SF of the target table DT.

In this case, when the body unit 300 rotates such that the side surface TS2 not covered by the support unit 320 among the side surfaces of the at least one tray 310 may be parallel to the side surface SF of the target table DT after the movement unit 200 arrives at the arrival point AP, a waiting time for the second user US2 to unload the object OB may occur. Thus, the second user US2 may feel unfamiliarity in the delivery of the object OB by the robot device 100, compared to the case where not the robot device 100 but the human delivers the object OB.

Also, when the human delivers the object OB, the human may naturally rotate the side surface TS2 not covered by the support unit 320 among the side surfaces of the at least one tray 310 to be parallel to the side surface SF of the target table DT during the movement to the arrival point AP in order unload the object OB. Thus, when the body unit 300 rotates such that the side surface TS2 not covered by the support unit 320 among the side surfaces of the at least one tray 310 may be parallel to the side surface SF of the target table DT after the robot device 100 arrives at the arrival point AP with the side surface TS1 covered by the support unit 320 among the side surfaces of the at least one tray 310 as the front surface, the second user US2 may feel unfamiliarity in the delivery of the object OB by the robot device 100.

In the case of the disclosure, by rotating the body unit 300 independently of the movement unit 200 while the movement unit 200 moves to the arrival point AP, the side surface TS2 not covered by the support unit 320 among the side surfaces of the at least one tray 310 may be parallel to the side surface SF of the target table DT when the movement unit 200 arrives at the arrival point AP. Thus, because the second user US2 may not have to wait for the body unit 300 to rotate in order to unload the object OB, the second user US2 may not feel unfamiliarity in the delivery of the object OB by the robot device 100.

Also, the second user US2 may not feel unfamiliarity in the delivery of the object OB by the robot device 100 because the side surface TS2 not covered by the support unit 320 among the side surfaces of the at least one tray 310 may naturally rotate to be parallel to the side surface SF of the target table DT while the movement unit 200 moves to the arrival point AP.

Figure 6:
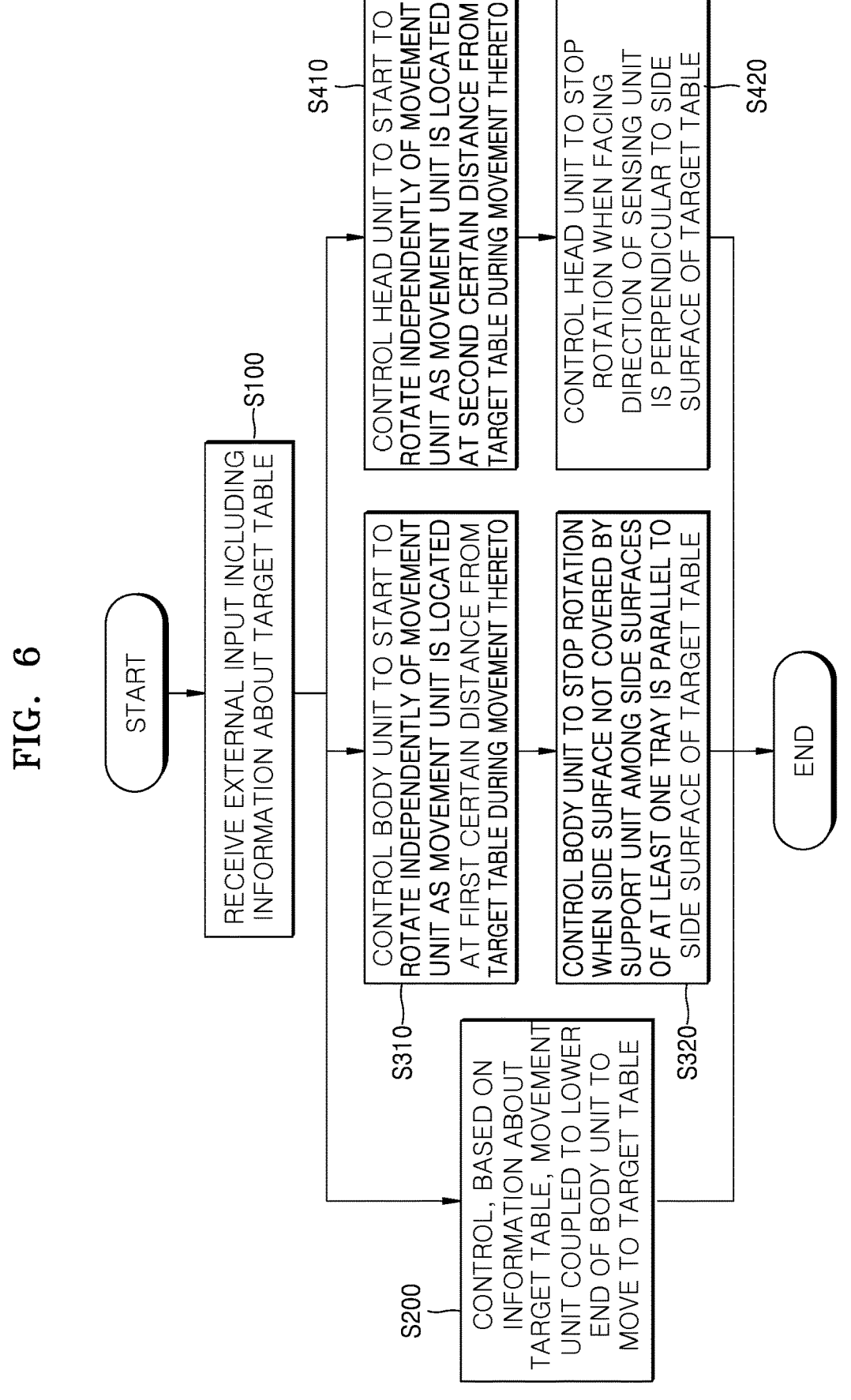
FIG. 6 is a flowchart for describing rotation of a body unit and a head unit during movement of a movement unit, according to an embodiment of the disclosure.

FIG. 6 is a flowchart for describing rotation of a body unit and a head unit during movement of a movement unit, according to an embodiment of the disclosure.

Hereinafter, like reference numerals will be assigned to like operations described above with reference to FIG. 4, and redundant descriptions thereof will be omitted for conciseness.

Referring to FIGS. 2, 5, and 6, in an embodiment of the disclosure, the operating method of the robot device 100 may include controlling the head unit 400 to start to rotate independently of the movement unit 200 as the movement unit 200 is located at a second certain distance different from the first certain distance from the target table DT during the movement thereto at operation S410. In an embodiment of the disclosure, the at least one processor 600 may start to rotate the head unit 400 independently of the movement unit 200 as the movement unit 200 is located at a second certain distance different from the first certain distance from the target table DT during the movement thereto. In an embodiment of the disclosure, the head unit 400 may rotate independently of the movement unit 200 and the body unit 300.

In an embodiment of the disclosure, when a point located at the second certain distance is referred to as a head rotation point (not illustrated), the robot device 100 obtain the head rotation point by using the head control module 530 (see FIG. 3).

In an embodiment of the disclosure, the robot device 100 may obtain the head rotation point based on the movement path MP and/or the like. Particularly, the robot device 100 may obtain the head rotation point based on whether the movement path MP is changed into a curved shape at the first point PT1 and the second point PT2 or whether the movement path MP is changed to a particular angle at least one of the first point PT1 or the second point PT2.

Also, in an embodiment of the disclosure, the robot device 100 may obtain the head rotation point based on information about the head unit 400. In an embodiment of the disclosure, the robot device 100 may obtain the head rotation point based on the rotation speed and/or the like of the head unit 400. Particularly, when the rotation speed of the head unit 400 rotating independently of the movement unit 200 is high, the robot device 100 may obtain the head rotation point having a second certain distance from the target table DT, which is relatively close thereto. On the other hand, when the rotation speed of the head unit 400 rotating independently of the movement unit 200 is low, the robot device 100 may obtain the head rotation point having a second certain distance from the target table DT, which is relatively distant therefrom.

In an embodiment of the disclosure, the second certain distance may be different from the first certain distance. In an embodiment of the disclosure, the second certain distance may be greater than or less than the first certain distance. Particularly, the second certain distance and the first certain distance may vary depending on the difference between the rotation speed of the head unit 400 and the rotation speed of the body unit 300. In an embodiment of the disclosure, when the rotation speed of the head unit 400 is greater than the rotation speed of the body unit 300, the second certain distance may be less than the first certain distance.

Also, the second certain distance and the first certain distance may vary depending on the difference between the rotation amount of the body unit 300 and the rotation amount of the head unit 400. In an embodiment of the disclosure, when the rotation speed of the head unit 400 and the rotation speed of the body unit 300 are equal to each other and the rotation amount of the head unit 400 is greater than the rotation amount of the body unit 300, the second certain distance may be greater than the first certain distance. However, the disclosure is not limited thereto, and the second certain distance may be equal to the first certain distance. Hereinafter, for convenience of description, the second certain distance is equal to the first certain distance, and the head rotation point is the same as the body rotation point RP.

In an embodiment of the disclosure, the operating method of the robot device 100 may include controlling the head unit 400 to stop the rotation when a facing direction HD (see FIG. 8A) of the sensing unit 410 is perpendicular to the side surface SF of the target table DT at operation S420. In an embodiment of the disclosure, the at least one processor 600 may stop the rotation of the head unit 400 when the facing direction HD of the sensing unit 410 is perpendicular to the side surface SF of the target table DT.

However, the disclosure is not limited thereto. In an embodiment of the disclosure, the operating method of the robot device 100 may include controlling the head unit 400 to stop the rotation when the facing direction HD of the sensing unit 410 and the direction perpendicular to the point on the target table DT closest to the robot device 100 are parallel to each other. In an embodiment of the disclosure, the at least one processor 600 may stop the rotation of the head unit 400 when the facing direction HD of the sensing unit 410 and the direction perpendicular to the point on the target table DT closest to the robot device 100 are parallel to each other.

In an embodiment of the disclosure, the at least one processor 600 may control the rotation of the head unit 400 such that the head unit 400 may start to rotate independently of the movement unit 200 at the body rotation point RP and the facing direction HD of the sensing unit 410 may be perpendicular to the side surface SF of the target table DT when the movement unit 200 arrives at the arrival point AP. However, the disclosure is not limited thereto. In an embodiment of the disclosure, the at least one processor 600 may control the rotation of the head unit 400 such that the head unit 400 may start to rotate independently of the movement unit 200 at the body rotation point RP, the facing direction HD of the sensing unit 410 may be perpendicular to the side surface SF of the target table DT before the movement unit 200 arrives at the arrival point AP, and the movement unit 200 may arrive at the arrival point AP while maintaining the perpendicular state.

In an embodiment of the disclosure, the facing direction HD of the sensing unit 410 and the side surface SF of the target table DT may be made perpendicular to each other in order to sense an operation or the like of the second user US2 unloading the object OB from the target table DT.

In an embodiment of the disclosure, while the movement unit 200 moves to the arrival point AP, by rotating the head unit 400 independently of the movement unit 200, the spacing direction HD of the sensing unit 410 may be made perpendicular to the side surface SF of the target table DT. In this case, the second user US2 may not feel unfamiliarity in the delivery of the object OB by the robot device 100, compared to the case where the head unit 400 rotates such that the facing direction HD of the head unit 400 may be perpendicular to the side surface SF of the target table DT after the movement unit 200 arrives at the arrival point AP in a state where the spacing direction HD of the head unit 400 is parallel to the movement direction MVD of the movement unit 200.

Figure 7:
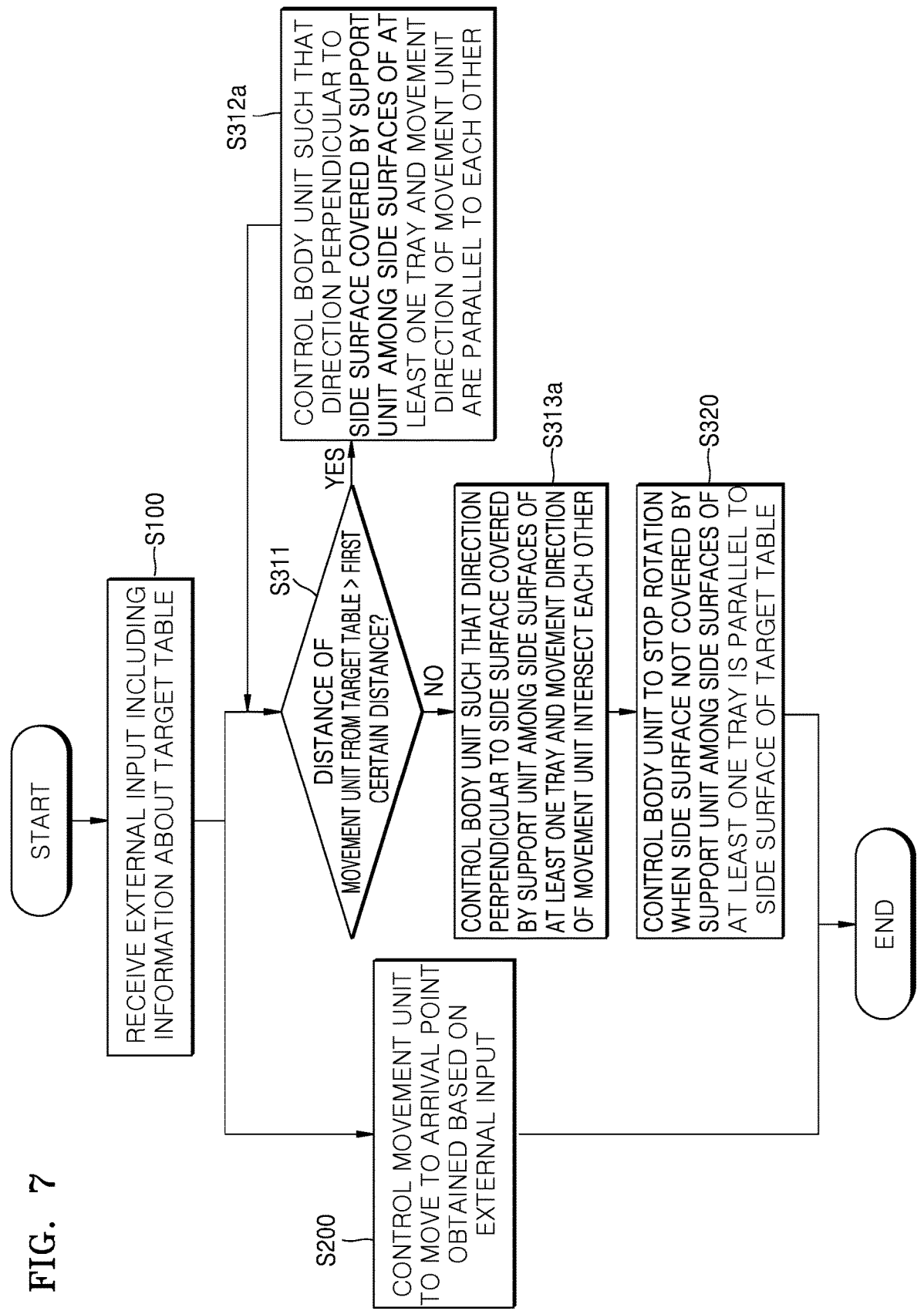
FIG. 7 is a flowchart for describing an operating method of a robot device according to a distance between a movement unit and a target table, according to an embodiment of the disclosure.

FIG. 7 is a flowchart for describing an operating method of a robot device according to a distance between a movement unit and a target table, according to an embodiment of the disclosure.

Figure 8A:
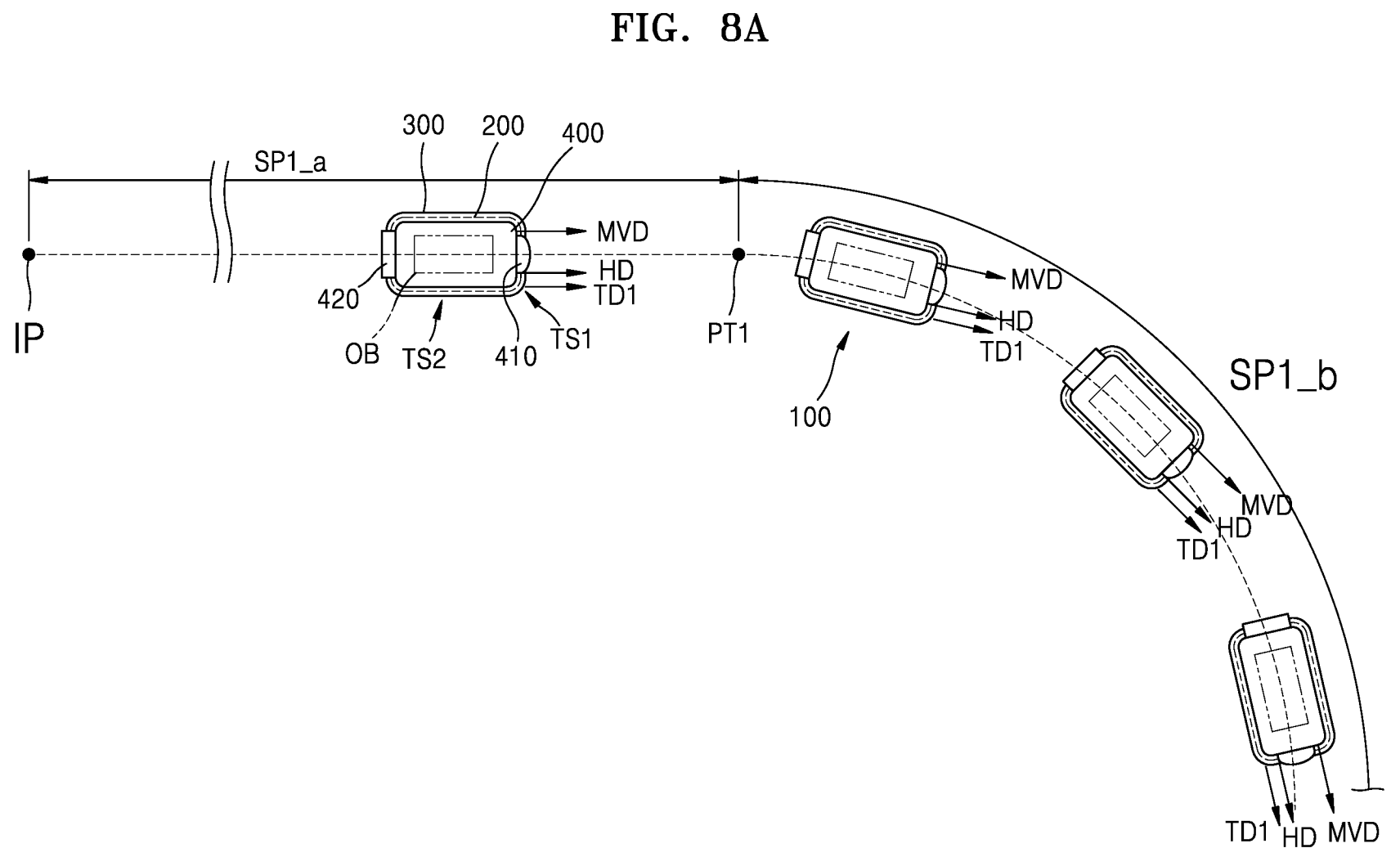

FIG. 8A is a conceptual diagram for describing an operating method of a robot device when a movement unit is located at a distance greater than a first certain distance from a target table, according to an embodiment of the disclosure.

Figure 8B:
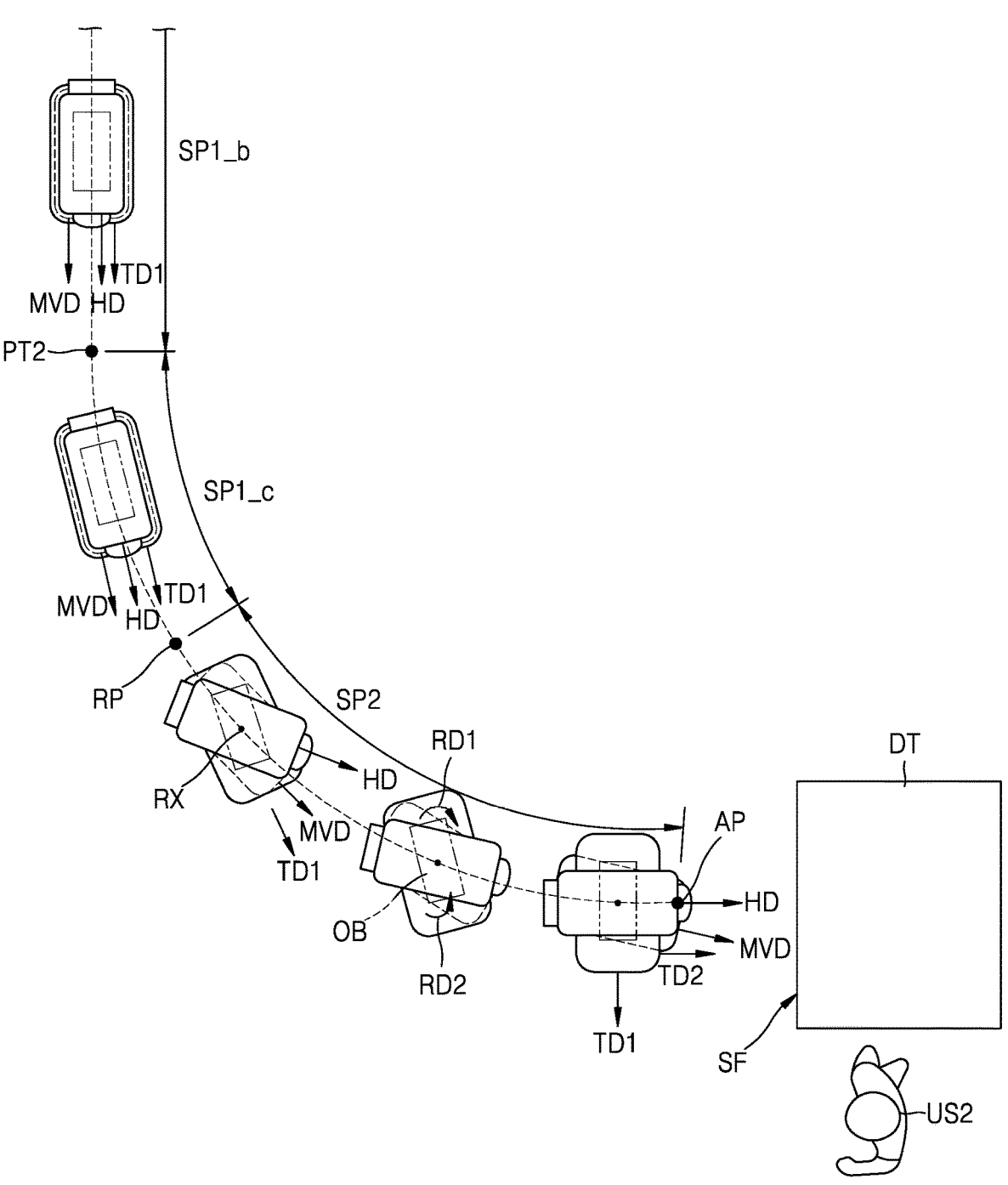
FIG. 8B is a conceptual diagram for describing an operating method of a robot device for controlling a direction perpendicular to a side surface of a tray covered by a support unit and a movement direction of a movement unit to intersect each other, according to an embodiment of the disclosure.

FIG. 8B is a conceptual diagram for describing an operating method of a robot device for controlling a direction perpendicular to a side surface of a tray covered by a support unit and a movement direction of a movement unit to intersect each other, according to an embodiment of the disclosure.

As an example of the disclosure, FIGS. 7, 8A, and 8B are diagrams for describing that the robot device 100 moves with the side surface TS1 covered by the support unit among the side surfaces of the at least one tray 310 as the front surface. Hereinafter, like reference numerals will be assigned to like operations described above with reference to FIG. 4, and redundant descriptions thereof will be omitted for conciseness.

Referring to FIG. 7, in an embodiment of the disclosure, the operating method of the robot device 100 may include determining whether the distance from the target table to the movement unit 200 is greater than a first certain distance at operation S311. In an embodiment of the disclosure, the operating method of the robot device 100 may include determining whether the distance from the target table DT is greater than a first certain distance while the movement unit 200 moves at operation S311. In an embodiment of the disclosure, the at least one processor 600 may determine whether the distance from the target table DT is greater than a first certain distance while the movement unit 200 moves.

Referring to FIGS. 2, 7, 8A, and 8B, in an embodiment of the disclosure, the operating method of the robot device 100 may include controlling the body unit 300 such that a direction TD1 perpendicular to the side surface TS1 covered by the support unit 320 among the side surfaces of the at least one tray 310 and the movement direction MVD of the movement unit 200 may be parallel to each other when the movement unit 200 is located at a distance greater than the first certain distance from the target table DT at operation S312a. As an example of the disclosure, when the movement unit 200 is located at a distance greater than the first certain distance from the target table DT, the at least one processor 600 may control the body unit 300 such that the direction TD1 perpendicular to the side surface TS1 covered by the support unit 320 among the side surfaces of the at least one tray 310 and the movement direction MVD of the movement unit 200 may be parallel to each other.

As an example of the disclosure, the first movement path SP1 (refer to FIG. 5) in the case where the movement unit 200 is located at a distance greater than the first certain distance from the target table DT may include the first to third sub movement paths SP1_a, SP1_b, and SP1_c.

As an example of the disclosure, the first sub movement path SP1_a may be a path along which the movement unit 200 and the body unit 300 move from the input point IP to the first point PT1 without rotation during the movement to the target table DT. As an example of the disclosure, when the robot device 100 moves with the side surface TS1 covered by the support unit 320 among the side surfaces of the at least one tray 310 as the front surface, the direction TD1 perpendicular to the side surface TS1 covered by the support unit 320 among the side surfaces of the at least one tray 310 and the movement direction MVD may be parallel to each other in the first sub movement path SP1_a. As an example of the disclosure, in the first sub movement path SP1_a, a direction TD2 perpendicular to the side surface TS2 not covered by the support unit 320 among the side surfaces of the at least one tray 310 and the movement direction MVD may be perpendicular to each other.

As an example of the disclosure, the second sub movement path SP1_b may be a path along which each of the movement unit 200 and the body unit 300 moves from the first point PT1 to the second point PT2 with the start of rotation during the movement to the target table DT. In the second sub movement path SP1_b, the rotation amount of the movement unit 200 and the rotation amount of the body unit 300 may be equal to each other. As an example of the disclosure, in the second sub movement path SP1_b, the body unit 300 may not rotate independently of the movement unit 200 but may rotate together with the movement unit 200 by being coupled to the movement unit 200. As an example of the disclosure, in the second sub movement path SP1_b, the direction TD1 perpendicular to the side surface TS1 covered by the support unit 320 among the side surfaces of the at least one tray 310 and the movement direction MVD may be parallel to each other. As an example of the disclosure, in the second sub movement path SP1_b, the direction TD2 perpendicular to the side surface TS2 not covered by the support unit 320 among the side surfaces of the at least one tray 310 and the movement direction MVD may be perpendicular to each other.

As an example of the disclosure, the third sub movement path SP1_c may be a path along which each of the movement unit 200 and the body unit 300 moves from the second point PT2 to the third point PT3 with the start of rotation during the movement to the target table DT. In the third sub movement path SP1_c, the rotation amount of the movement unit 200 and the rotation amount of the body unit 300 may be equal to each other. As an example of the disclosure, in the third sub movement path SP1_c, the body unit 300 may not rotate independently of the movement unit 200 but may rotate together with the movement unit 200 by being coupled to the movement unit 200. As an example of the disclosure, in the third sub movement path SP1_c, the direction TD1 perpendicular to the side surface TS1 covered by the support unit 320 among the side surfaces of the at least one tray 310 and the movement direction MVD may be parallel to each other. As an example of the disclosure, in the third sub movement path SP1_c, the direction TD2 perpendicular to the side surface TS2 not covered by the support unit 320 among the side surfaces of the at least one tray 310 and the movement direction MVD may be perpendicular to each other.

FIGS. 8A and 8B illustrate that the first movement path SP1 includes a path divided into the first to third sub movement paths SP1_a, SP1_b, and SP1_c; however, the disclosure is not limited thereto. As an example of the disclosure, during the movement to the target table DT, the first movement path SP1 may include a single sub movement path for moving from the input point IP to the body rotation point RP at a first certain distance from the target table DT in a state where the movement direction MVD and the direction TD1 perpendicular to the side surface TS1 covered by the support unit 320 among the side surfaces of the at least one tray 310 are parallel to each other.

In an embodiment of the disclosure, the operating method of the robot device 100 may include controlling the body unit 300 such that the direction TD1 perpendicular to the side surface TS1 covered by the support unit 320 among the side surfaces of the at least one tray 310 and the movement direction MVD of the movement unit 200 may intersect each other when the movement unit 200 is located at a first certain distance or a distance less than the first certain distance from the target table DT at operation S313a. As an example of the disclosure, when the movement unit 200 is located at a first certain distance or a distance less than the first certain distance from the target table DT, the at least one processor 600 may control the body unit 300 such that the direction TD1 perpendicular to the side surface TS1 covered by the support unit 320 among the side surfaces of the at least one tray 310 and the movement direction MVD of the movement unit 200 may intersect each other.

As an example of the disclosure, the second movement path SP2 may be a path along which each of the movement unit 200 and the body unit 300 rotates and moves from the body rotation point RP located at a first certain distance from the target table DT to the arrival point AP at which the target table DT is reached. As an example of the disclosure, in the second movement path SP2, the body unit 300 may rotate independently of the movement unit 200. As an example of the disclosure, in the second movement path SP2, the rotation amount of the body unit 300 may be different from the rotation amount of the movement unit 200. As an example of the disclosure, in the second movement path SP2, the rotation amount of the body unit 300 may be less than the rotation amount of the movement unit 200. Accordingly, the movement direction MVD of the movement unit 200 and the direction TD1 perpendicular to the side surface TS1 covered by the support unit 320 among the side surfaces of the at least one tray 310 may intersect each other.

As an example of the disclosure, the body unit 300 may rotate around the rotation axis RX independently of the movement unit 200. As an example of the disclosure, the body unit 300 may rotate in a first direction RD1 around the rotation axis RX such that the direction TD2 perpendicular to the side surface TS2 not covered by the support unit 320 among the side surfaces of the at least one tray 310 may be perpendicular to the side surface SF of the target table DT. However, the disclosure is not limited thereto. The rotation direction of the body unit 300 may vary depending on the position of the input point IP, the position of the target table DT, and/or the like.

As an example of the disclosure, at the arrival point AP, the direction TD2 perpendicular to the side surface TS2 not covered by the support unit 320 among the side surfaces of the at least one tray 310 may be parallel to the side surface SF of the target table DT. However, the disclosure is not limited thereto. The robot device 100 may move with the side surface TS2 not covered by the support unit 320 among the side surfaces of the at least one tray 310 and the side surface SF of the target table DT being parallel to each other from before the arrival point AP and may move to the arrival point AP while maintaining the parallel state.

In an embodiment of the disclosure, the operating method of the robot device 100 may further include controlling the head unit 400 such that the facing direction HD of the sensing unit 410 and the movement direction MVD of the movement unit 200 may be parallel to each other when the movement unit 200 is located at a distance greater than the second certain distance from the target table DT. As an example of the disclosure, the at least one processor 600 may control the head unit 400 such that the facing direction HD of the sensing unit 410 and the movement direction MVD of the movement unit 200 may be parallel to each other when the movement unit 200 is located at a distance greater than the second certain distance from the target table DT.

As an example of the disclosure, the operating method of the robot device 100 may further include controlling the body unit 300 and the head unit 400 such that the facing direction HD of the sensing unit 410, the direction TD1 perpendicular to the side surface TS1 covered by the support unit 320 among the side surfaces of the at least one tray 310, and the movement direction MVD of the movement unit 200 may be parallel to each other when the movement unit 200 is located at a distance greater than the second certain distance from the target table DT.

In an embodiment of the disclosure, in the first movement path SP1, the rotation amount of the movement unit 200 and the rotation amount of the head unit 400 may be equal to each other. As an example of the disclosure, in the first movement path SP1, the rotation amounts of the movement unit 200, the body unit 300, and the head unit 400 may be equal to each other. As an example of the disclosure, in the first movement path SP1, the head unit 400 may not rotate independently of the movement unit 200 and the body unit

300 but may rotate together with the movement unit 200 and the body unit 300 by being coupled to the movement unit 200 and the body unit 300. As an example of the disclosure, in the first movement path SP1, the facing direction HD of the sensing unit 410 and the movement direction MVD of the movement unit 200 may be parallel to each other. As an example of the disclosure, in the first movement path SP1, the facing direction HD of the sensing unit 410, the direction TD1 perpendicular to the side surface TS1 covered by the support unit 320 among the side surfaces of the at least one tray 310, and the movement direction MVD of the movement unit 200 may be parallel to each other.

In an embodiment of the disclosure, the operating method of the robot device 100 may further include controlling the head unit 400 such that the facing direction HD of the sensing unit 410 and the movement direction MVD of the movement unit 200 may intersect each other when the movement unit 200 is located at a second certain distance or a distance less than the second certain distance from the target table DT. As an example of the disclosure, the at least one processor 600 may control the head unit 400 such that the facing direction HD of the sensing unit 410 and the movement direction MVD of the movement unit 200 may intersect each other when the movement unit 200 is located at a second certain distance or a distance less than the second certain distance from the target table DT.

In an embodiment of the disclosure, in the second movement path SP2, the movement unit 200 and the head unit 400 may rotate independently of each other. In an embodiment of the disclosure, in the second movement path SP2, the rotation amount of the movement unit 200 and the rotation amount of the head unit 400 may be different from each other. As an example of the disclosure, in the second movement path SP2, the rotation amount of the head unit 400 may be greater than the rotation amount of the movement unit 200. Accordingly, the movement direction MVD of the movement unit 200 and the facing direction HD of the sensing unit 410 may intersect each other.

In an embodiment of the disclosure, the operating method of the robot device 100 may further include controlling the body unit 300 and the head unit 400 such that the facing direction HD of the sensing unit 410, the direction TD1 perpendicular to the side surface TS1 covered by the support unit 320 among the side surfaces of the at least one tray 310, and the movement direction MVD of the movement unit 200 may intersect each other when the movement unit 200 is located at a second certain distance or a distance less than the second certain distance from the target table DT. In an embodiment of the disclosure, when the movement unit 200 is located at a second certain distance or a distance less than the second certain distance from the target table DT, the at least one processor 600 may control the head unit 400 such that the facing direction HD of the sensing unit 410, the direction TD1 perpendicular to the side surface TS1 covered by the support unit 320 among the side surfaces of the at least one tray 310, and the movement direction MVD of the movement unit 200 may intersect each other.

In an embodiment of the disclosure, in the second movement path SP2, the movement unit 200, the body unit 300, and the head unit 400 may rotate independently of each other. In an embodiment of the disclosure, in the second movement path SP2, the rotation amount of the movement unit 200, the rotation amount of the body unit 300, and the rotation amount of the head unit 400 may be different from each other. In an embodiment of the disclosure, in the second movement path SP2, the rotation amount of the movement unit 200 may be greater than the rotation amount of the body unit 300. The rotation amount of the head unit 400 may be greater than the rotation amount of the movement unit 200. The movement direction MVD of the movement unit 200, the direction TD1 perpendicular to the side surface TS1 covered by the support unit 320 among the side surfaces of the at least one tray 310, and the facing direction HD of the sensing unit 410 may intersect each other.

In an embodiment of the disclosure, the body unit 300 and the head unit 400 may rotate separately around the rotation axis RX. In an embodiment of the disclosure, the body unit 300 may rotate around the rotation axis RX in a first direction RD1 such that the direction TD2 perpendicular to the side surface TS2 not covered by the support unit 320 among the side surfaces of the at least one tray 310 may be perpendicular to the side surface SF of the target table DT.

In an embodiment of the disclosure, the head unit 400 may rotate around the rotation axis RX in a second direction RD2 opposite to the first direction RD1 such that the facing direction HD of the sensing unit 410 may be perpendicular to the side surface SF of the target table DT.

However, the disclosure is not limited thereto. The rotation direction of the body unit 300 and the head unit 400 may vary depending on the position of the input point IP, the position of the target table DT, and/or the like. In an embodiment of the disclosure, the body unit 300 and the head unit 400 may rotate in the same direction.

In an embodiment of the disclosure, the body unit 300 may stop the rotation when the direction TD2 perpendicular to the side surface TS2 not covered by the support unit 320 among the side surfaces of the at least one tray 310 is perpendicular to the side surface SF of the target table DT. In an embodiment of the disclosure, the at least one processor 600 may control the rotation of the body unit 300 such that the side surface TS2 not covered by the support unit 320 among the side surfaces of the at least one tray 310 may be perpendicular to the side surface SF of the target table DT when the movement unit 200 arrives at the arrival point AP, and may stop the rotation of the body unit 300 at the arrival point AP. However, the disclosure is not limited thereto. The at least one processor 600 may control the rotation of the body unit 300 such that the side surface TS2 not covered by the support unit 320 among the side surfaces of the at least one tray 310 may be parallel to the side surface SF of the target table DT before the movement unit 200 arrives at the arrival point AP, and may control the rotation of the body unit 300 to maintain the parallel state until the movement unit 200 arrives at the arrival point AP.

Figure 9:
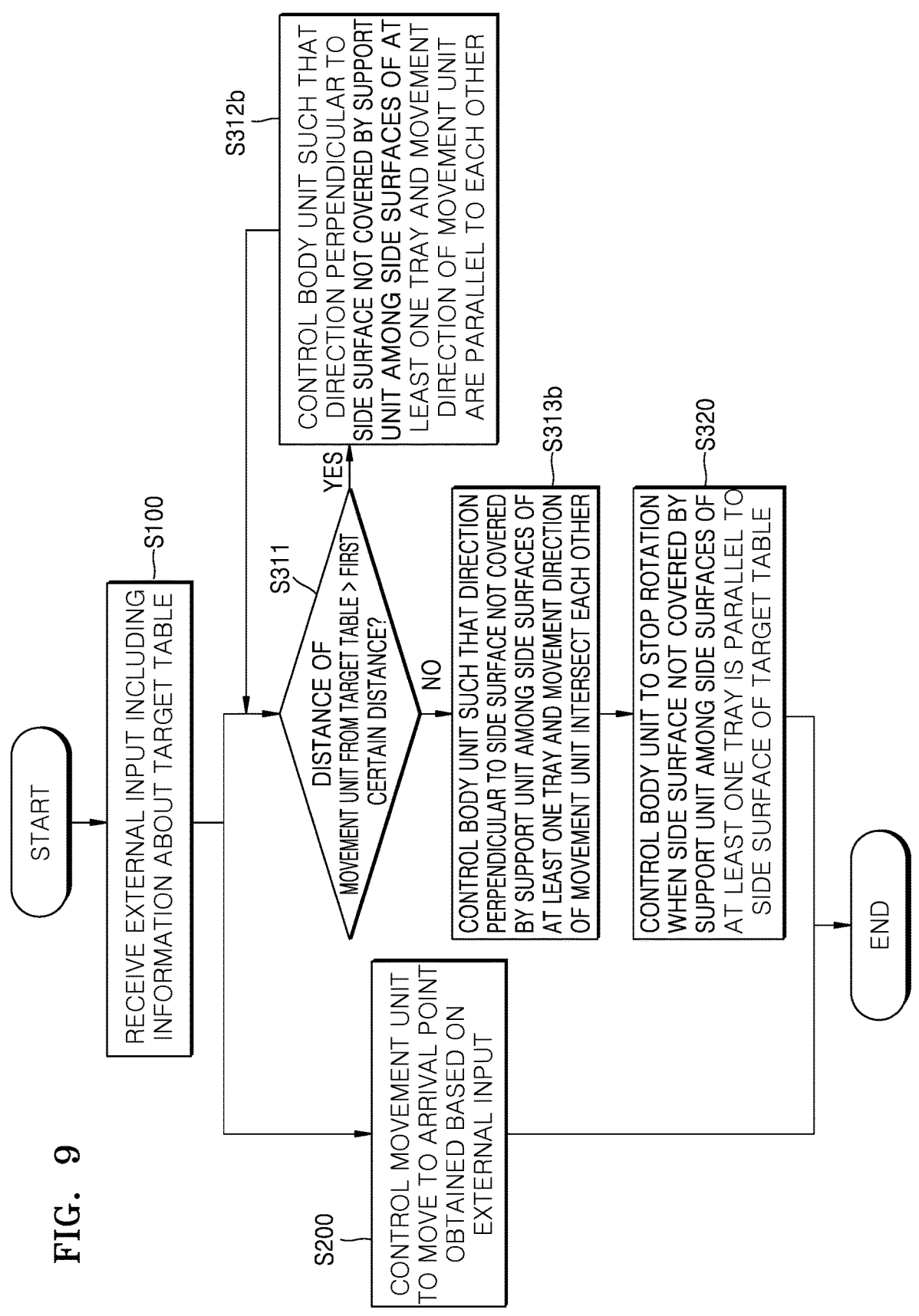
FIG. 9 is a flowchart for describing an operating method of a robot device according to a distance between a movement unit and a target table, according to an embodiment of the disclosure.

FIG. 9 is a flowchart for describing an operating method of a robot device according to a distance between a movement unit and a target table, according to an embodiment of the disclosure.

Figure 10A:
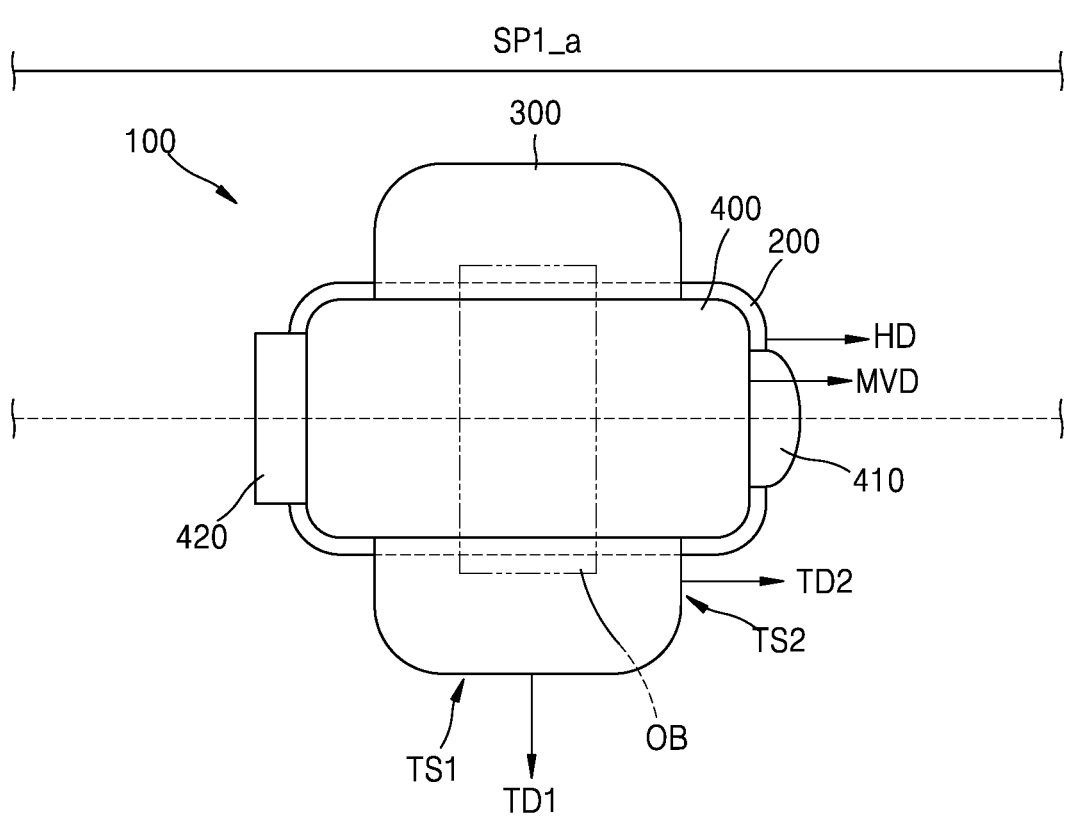
FIG. 10A is a conceptual diagram for describing an operating method of a robot device when a movement unit is located at a distance greater than a first certain distance from a target table, according to an embodiment of the disclosure.

FIG. 10A is a conceptual diagram for describing an operating method of a robot device when a movement unit is located at a distance greater than a first certain distance from a target table, according to an embodiment of the disclosure.

Figure 10B:
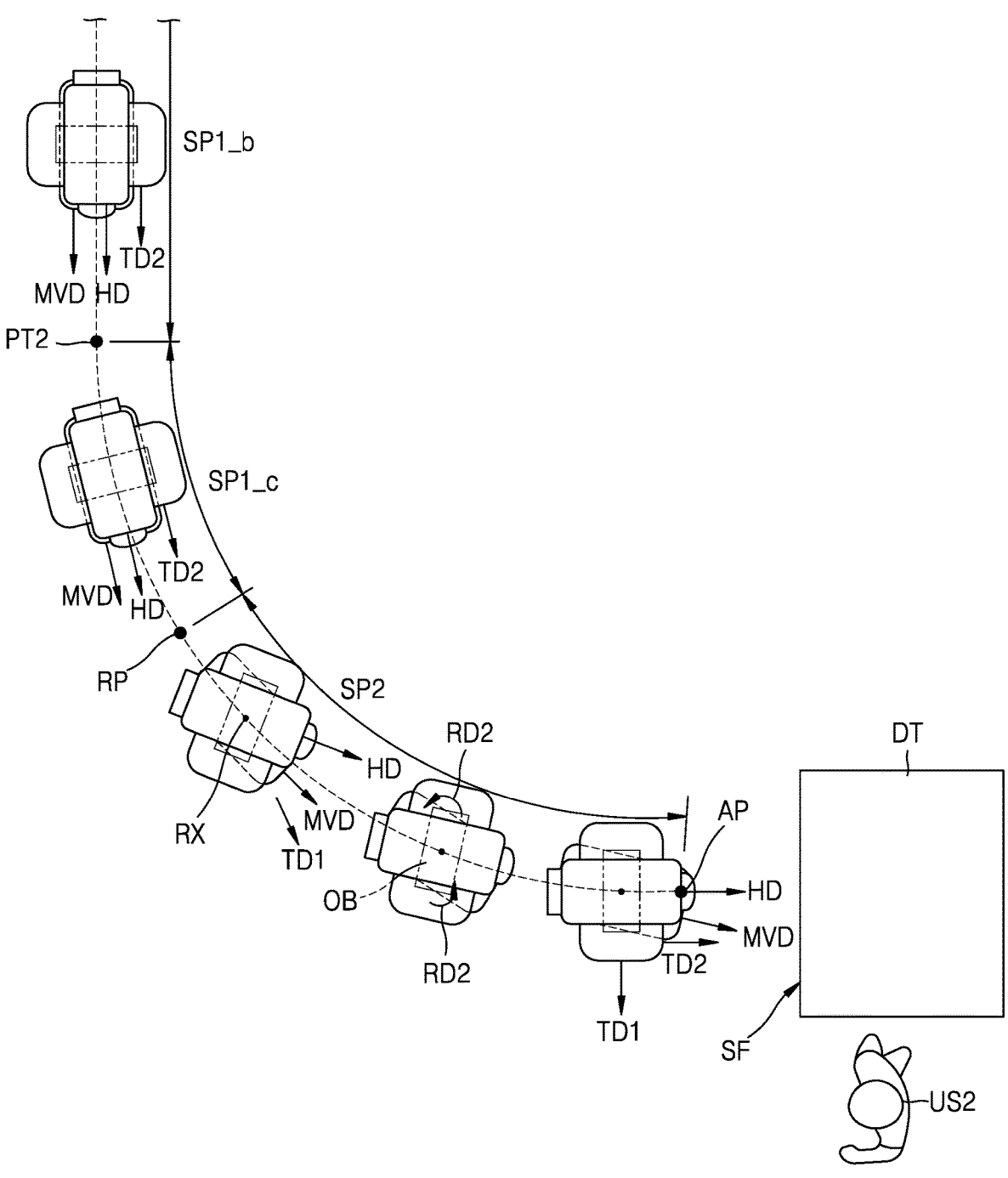
FIG. 10B is a conceptual diagram for describing an operating method of a robot device for controlling a direction perpendicular to a side surface of a tray not covered by a support unit and a movement direction of a movement unit to intersect each other, according to an embodiment of the disclosure.

FIG. 10B is a conceptual diagram for describing an operating method of a robot device for controlling a direction perpendicular to a side surface of a tray not covered by a support unit and a movement direction of a movement unit to intersect each other, according to an embodiment of the disclosure.

As an embodiment of the disclosure, FIGS. 9, 10A, and 10B are diagrams for describing that the robot device 100 moves with the side surface TS2 not covered by the support unit among the side surfaces of the at least one tray 310 as the front surface. Hereinafter, like reference numerals will be assigned to like operations described above with reference to FIGS. 4, 7, and 8A, and redundant descriptions thereof will be omitted for conciseness.

Referring to FIGS. 9, 10A, and 10B, in an embodiment of the disclosure, the operating method of the robot device 100 may include controlling the body unit 300 such that the direction TD2 perpendicular to the side surface TS2 not covered by the support unit 320 among the side surfaces of the at least one tray 310 and the movement direction MVD of the movement unit 200 may be parallel to each other when the movement unit 200 is located at a distance greater than the first certain distance from the target table DT at operation S312*b*. In an embodiment of the disclosure, when the movement unit 200 is located at a distance greater than the first certain distance from the target table DT, the at least one processor 600 may control the body unit 300 such that the direction TD2 perpendicular to the side surface TS2 not covered by the support unit 320 among the side surfaces of the at least one tray 310 and the movement direction MVD of the movement unit 200 may be parallel to each other.

In an embodiment of the disclosure, in the first movement path SP1 (see FIG. 5), the direction TD2 perpendicular to the side surface TS2 not covered by the support unit 320 among the side surfaces of the at least one tray 310 and the movement direction MVD may be parallel to each other. In an embodiment of the disclosure, in the first movement path SP1, the direction TD2 perpendicular to the side surface TS2 not covered by the support unit 320 among the side surfaces of the at least one tray 310, the facing direction HD of the sensing unit 410, and the movement direction MVD of the movement unit 200 may be parallel to each other.

In an embodiment of the disclosure, the operating method of the robot device 100 may include controlling the body unit 300 such that the direction TD2 perpendicular to the side surface TS2 not covered by the support unit 320 among the side surfaces of the at least one tray 310 and the movement direction MVD of the movement unit 200 may intersect each other when the movement unit 200 is located at a first certain distance or a distance less than the first certain distance from the target table DT (S313*b*). In an embodiment of the disclosure, when the movement unit 200 is located at a first certain distance or a distance less than the first certain distance from the target table DT, the at least one processor 600 may control the body unit 300 such that the direction TD2 perpendicular to the side surface TS2 not covered by the support unit 320 among the side surfaces of the at least one tray 310 and the movement direction MVD of the movement unit 200 may intersect each other.

In an embodiment of the disclosure, in the second movement path SP2, the body unit 300 may rotate independently of the movement unit 200. In an embodiment of the disclosure, in the second movement path SP2, the rotation amount of the body unit 300 may be different from the rotation amount of the movement unit 200. In an embodiment of the disclosure, in the second movement path SP2, the rotation amount of the body unit 300 may be greater than the rotation amount of the movement unit 200. Accordingly, the movement direction MVD of the movement unit 200 and the direction TD2 perpendicular to the side surface TS2 not covered by the support unit 320 among the side surfaces of the at least one tray 310 may intersect each other.

In an embodiment of the disclosure, the body unit 300 may rotate around the rotation axis RX independently of the movement unit 200. In an embodiment of the disclosure, the body unit 300 may rotate around the rotation axis RX in a second direction RD2 such that the direction TD2 perpendicular to the side surface TS2 not covered by the support unit 320 among the side surfaces of the at least one tray 310 may be perpendicular to the side surface SF of the target table DT. However, the disclosure is not limited thereto. The rotation direction of the body unit 300 may vary depending on the position of the input point IP, the position of the target table DT, and/or the like.

In an embodiment of the disclosure, in the second movement path SP2, the movement unit 200, the body unit 300, and the head unit 400 may rotate independently of each other. In an embodiment of the disclosure, in the second movement path SP2, the rotation amount of the movement unit 200, the rotation amount of the body unit 300, and the rotation amount of the head unit 400 may be different from each other. Accordingly, the movement direction MVD of the movement unit 200, the direction TD2 perpendicular to the side surface TS2 not covered by the support unit 320 among the side surfaces of the at least one tray 310, and the facing direction HD of the sensing unit 410 may intersect each other.

In an embodiment of the disclosure, the body unit 300 and the head unit 400 may rotate separately around the rotation axis RX. In an embodiment of the disclosure, the head unit 400 may rotate around the rotation axis RX in the second direction RD2 such that the facing direction HD of the sensing unit 410 may be parallel to the side surface SF of the target table DT. However, the disclosure is not limited thereto. The rotation direction of the body unit 300 and the head unit 400 may vary depending on the position of the input point IP, the position of the target table DT, and/or the like.

As an example of the disclosure, at the arrival point AP, the movement direction MVD of the movement unit 200 may not be parallel to a direction perpendicular to the side surface SF of the target table DT. In this case, by rotating the body unit 300 independently of the movement unit 200 while the movement unit 200 moves to the arrival point AP, the side surface TS2 not covered by the support unit 320 among the side surfaces of the at least one tray 310 may be parallel to the side surface SF of the target table DT when the movement unit 200 arrives at the arrival point AP. Thus, because the second user US2 may not have to wait for the body unit 300 to rotate in order to unload the object OB, the second user US2 may not feel unfamiliarity in the delivery of the object OB by the robot device 100.

Also, the second user US2 may not feel unfamiliarity in the delivery of the object OB by the robot device 100 because the side surface TS2 not covered by the support unit 320 among the side surfaces of the at least one tray 310 may naturally rotate to be parallel to the side surface SF of the target table DT while the movement unit 200 moves to the arrival point AP.

FIG. 11 is a flowchart for describing an operating method of a robot device for controlling at least one tray to exit in a direction toward a target table or to enter in a direction toward a support unit, according to an embodiment of the disclosure.

Figure 12A:
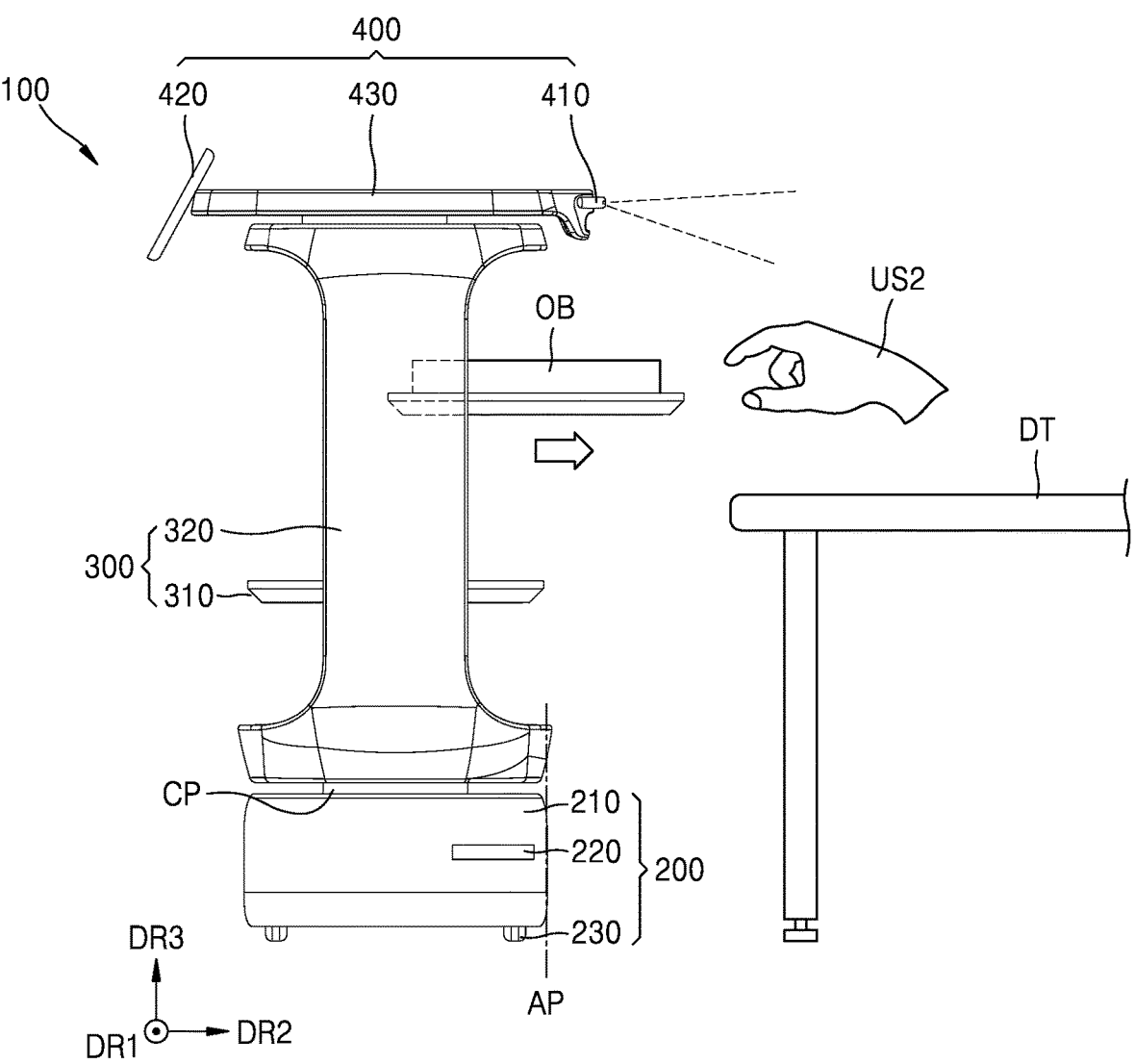
FIG. 12A is a diagram for describing an operating method of a robot device for controlling a tray to exit in a direction toward a target table, according to an embodiment of the disclosure.

FIG. 12A is a diagram for describing an operating method of a robot device for controlling a tray to exit in a direction toward a target table, according to an embodiment of the disclosure.

Figure 12B:
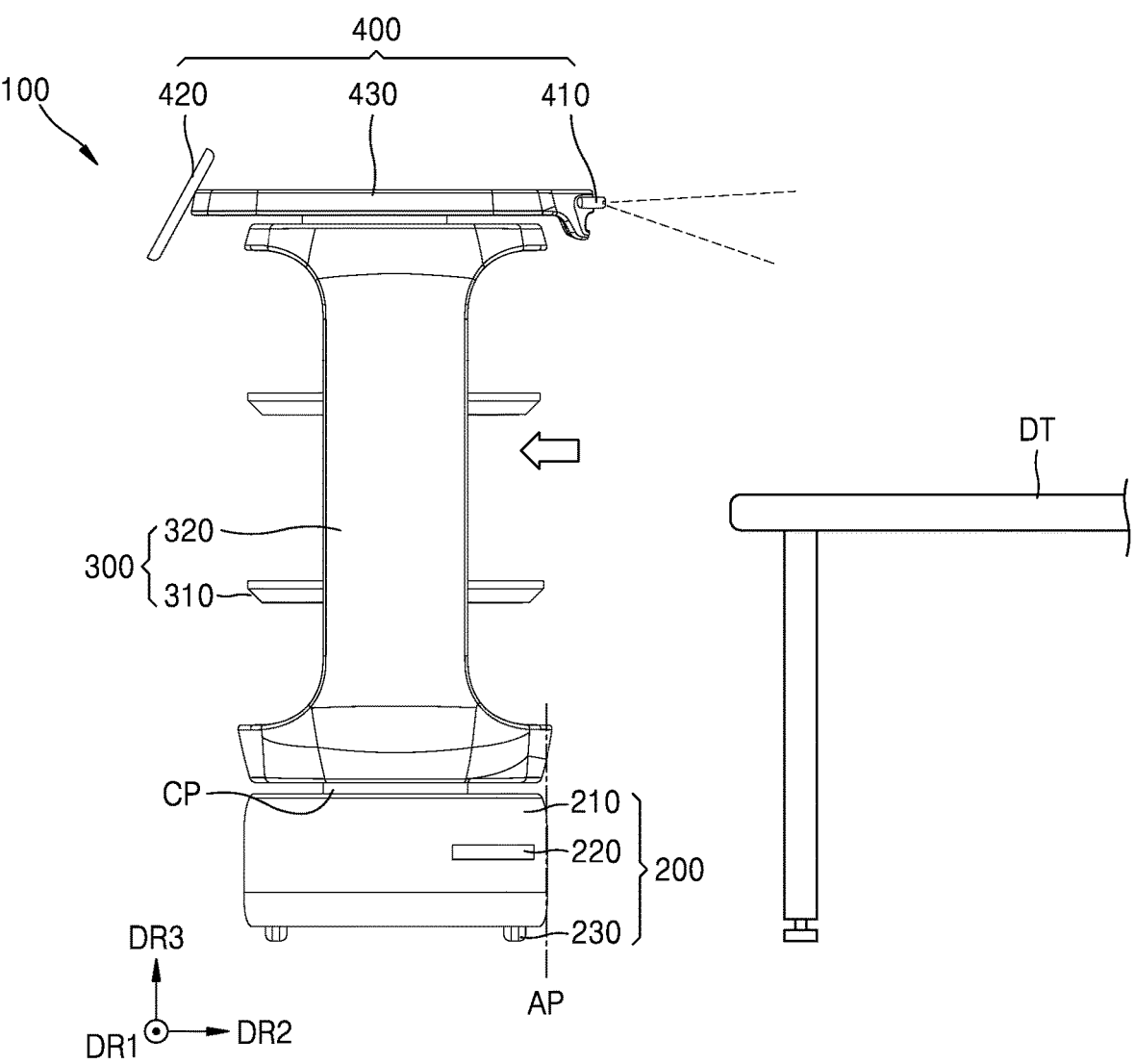
FIG. 12B is a diagram for describing an operating method of a robot device for controlling a tray to enter in a direction toward a support unit, according to an embodiment of the disclosure.

FIG. 12B is a diagram for describing an operating method of a robot device for controlling a tray to enter in a direction toward a support unit, according to an embodiment of the disclosure. Hereinafter, like reference numerals will be assigned to like components and operations described above with reference to FIGS. 2 and 6, and redundant descriptions thereof will be omitted for conciseness.

Referring to FIGS. 11 and 12A, in an embodiment of the disclosure, the operating method of the robot device 100 may include controlling the at least one tray 310 loaded with the object OB to exit in a direction from the support unit 320 toward the target table DT after the movement unit 200 arrives at the target table DT at operation S500. In an embodiment of the disclosure, the at least one processor 600 (see FIG. 3) may control the at least one tray 310 loaded with the object OB to exit in a direction from the support unit 320 toward the target table DT after the movement unit 200 arrives at the target table DT.

In an embodiment of the disclosure, based on the received information about the target table DT, the movement unit 200 may arrive at the arrival point AP that is a point corresponding to the target table DT. The second user US may approach the at least one tray 310 in order to unload the object OB accommodated in the at least one tray 310. The at least one processor 600 may control the at least one tray 310 to exit in a direction from the support unit 320 toward the target table DT in order to allow the second user US2 to easily unload the object OB from the at least one tray 310. In an embodiment of the disclosure, the controlling of the at least one tray 310 loaded with the object OB to exit in a direction from the support unit 320 toward the target table DT at operation S500 may include controlling the sensing unit 410 to obtain information about the approach of the second user US2 on the target table DT. In an embodiment of the disclosure, the at least one processor 600 may obtain information about the approach of the second user US2 on the target table DT through the sensing unit 410.

In an embodiment of the disclosure, the controlling of the at least one tray 310 loaded with the object OB to exit in a direction from the support unit 320 toward the target table DT at operation S500 may include controlling, based on the information about the approach of the second user US2, the at least one tray 310 loaded with the object OB to exit in a direction from the support unit 320 toward the target table DT. In an embodiment of the disclosure, based on the information about the approach of the user, the at least one processor 600 may control the at least one tray 310 loaded with the object OB to exit in a direction from the support unit 320 toward the target table DT.

In an embodiment of the disclosure, the sensing unit 410 may obtain information about a target approaching the at least one tray 310 by sensing around the at least one tray 310. In an embodiment of the disclosure, the sensing unit 410 may sense that the second user US2 approaches the at least one tray 310 on the target table DT and may obtain information about the approach of the second user US2. As an example of the disclosure, when the approach of the second user US2 is sensed within a preset range, the sensing unit 410 may obtain information about the approach of the second user US2 by determining that the second user US2 approaches the at least one tray 310 loaded with the object OB.

Referring to FIGS. 11 and 12B, in an embodiment of the disclosure, the operating method of the robot device 100 may include controlling the at least one tray 310 to enter in a direction from the target table DT toward the support unit 320 when the object OB is unloaded from the at least one tray 310 at operation S600. In an embodiment of the disclosure, when the object OB is unloaded from the at least one tray 310, the at least one processor 600 may control the at least one tray 310 to enter in a direction from the target table DT toward the support unit 320.

In an embodiment of the disclosure, the controlling of the at least one tray 310 to enter in a direction from the target table DT toward the support unit 320 at operation S600 may include controlling the sensing unit 410 to obtain information about the approach of the second user US2 on the target table DT. In an embodiment of the disclosure, the at least one processor 600 may obtain information about the approach of the second user US2 on the target table DT through the sensing unit 410.

In an embodiment of the disclosure, the controlling of the at least one tray 310 to enter in a direction from the target table DT toward the support unit 320 at operation S600 may include controlling the at least one tray 310 to enter in a direction from the target table DT toward the support unit 320 when information about the approach of the second user US2 is not obtained for a preset time or more. In an embodiment of the disclosure, the at least one processor 600 may control the at least one tray 310 to enter in a direction from the target table DT toward the support unit 320 when information about the approach of the second user US2 on the target table DT is not obtained through the sensing unit 410 for a preset time or more.

In an embodiment of the disclosure, when information about the approach of the second user US2 is not sensed through the sensing unit 410 for a preset time or more, the at least one processor 600 may determine that the object OB has already been unloaded from the at least one tray 310 or that the second user US2 has no intention to unload the object OB from the at least one tray 310. In this case, the at least one processor 600 may control the at least one tray 310, which has exited in a direction toward the target table DT, to enter in a direction toward the support unit 320. As an example of the disclosure, the preset time may be an average value or the like of the times taken to approach the at least one tray 310 when the second user US2 has unloaded the object OB from the at least one tray 310.

In an embodiment of the disclosure, the controlling of the at least one tray 310 to enter in a direction from the target table DT toward the support unit 320 at operation S600 may include obtaining a weight corresponding to the at least one tray 310. In an embodiment of the disclosure, the at least one processor 600 may obtain a weight corresponding to at least one tray 310 through the weight sensor 330 (see FIG. 3). As an example of the disclosure, the weight corresponding to the at least one tray 310 may include the weight of the at least one tray 310 and the object OB arranged on the at least one tray 310.

In an embodiment of the disclosure, the controlling of the at least one tray 310 to enter in a direction from the target table DT toward the support unit 320 at operation S600 may include controlling the at least one tray 310 to enter in a direction from the target table DT toward the support unit 320 when the obtained weight of the object OB is less than or equal to a preset weight. In an embodiment of the disclosure, the at least one processor 600 may control the at least one tray 310 to enter in a direction from the target table DT toward the support unit 320 when the weight corresponding to the at least one tray 310 obtained through the weight sensor 330 is less than or equal to a preset weight.

In an embodiment of the disclosure, when the obtained weight of the object OB is less than or equal to a preset weight, the at least one processor 600 may determine that the object OB has been unloaded from the at least one tray 310. In this case, the at least one processor 600 may control the at least one tray 310, which has exited in a direction toward the target table DT, to enter in a direction toward the support unit 320. As an example of the disclosure, the preset weight may be a weight measured when the object OB is not loaded on the at least one tray 310, a weight measured when only a serving tray accommodating the object OB, which is used to load the object OB on the at least one tray 310, is loaded, or the like.

Figure 13A:
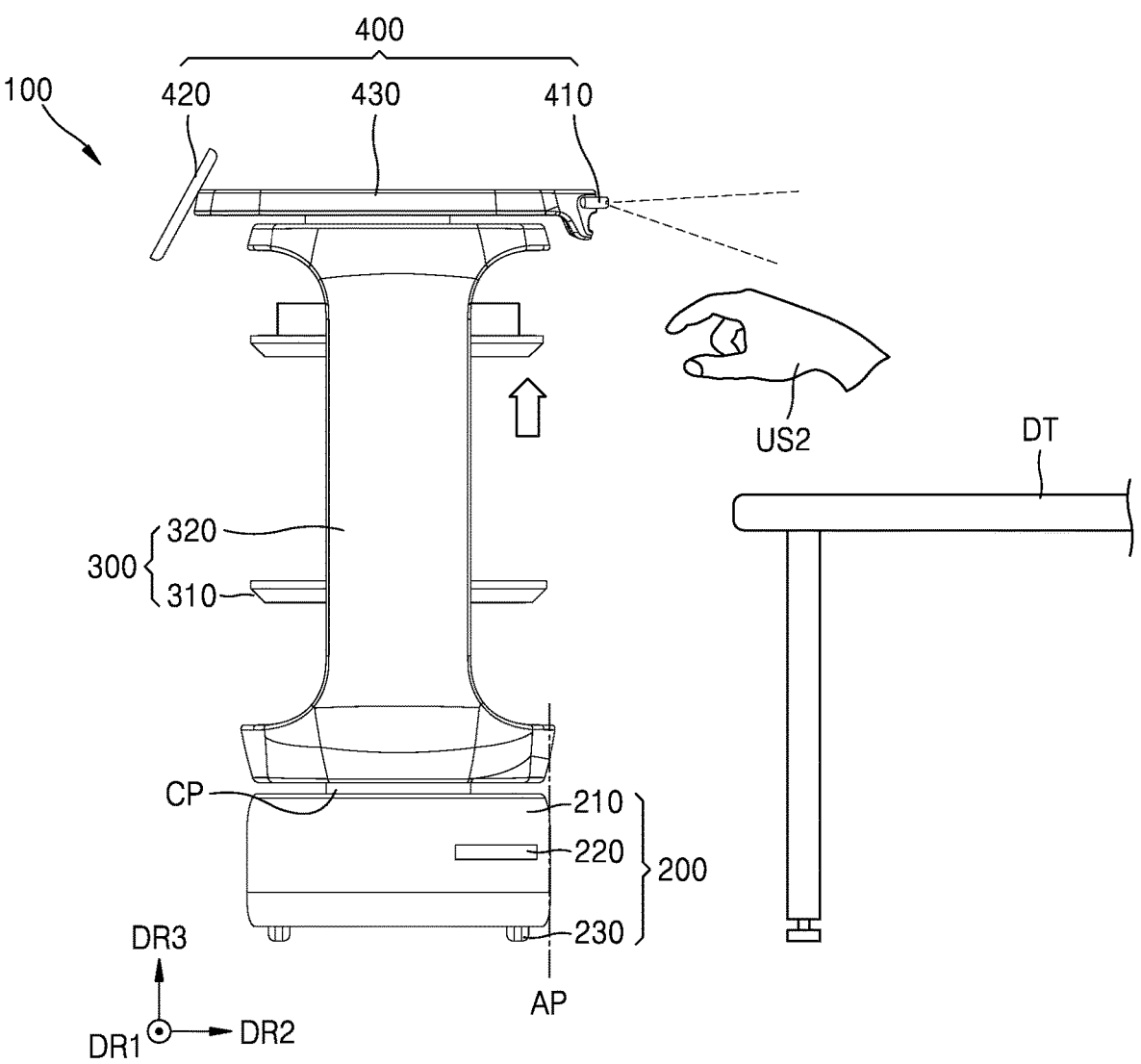
FIG. 13A is a diagram for describing an operating method of a robot device for controlling a tray to move in a direction toward a head unit, according to an embodiment of the disclosure.

FIG. 13A is a diagram for describing an operating method of a robot device for controlling a tray to move in a direction toward a head unit, according to an embodiment of the disclosure.

Figure 13B:
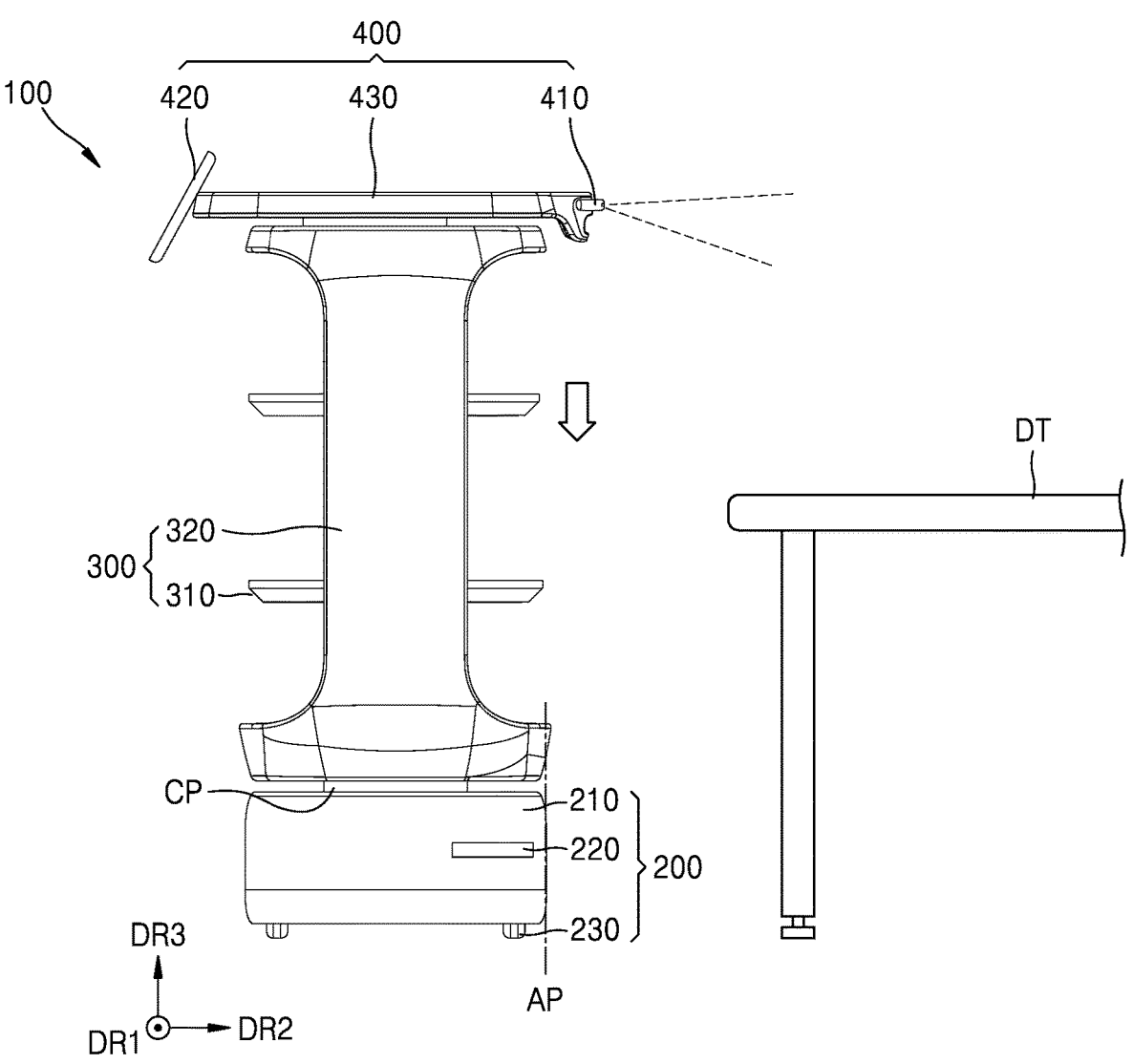
FIG. 13B is a diagram for describing an operating method of a robot device for controlling a tray to move in a direction toward a movement unit, according to an embodiment of the disclosure.

FIG. 13B is a diagram for describing an operating method of a robot device for controlling a tray to move in a direction toward a movement unit, according to an embodiment of the disclosure.

Hereinafter, like reference numerals will be assigned to like components described above with reference to FIGS. 12A and 12B, and redundant descriptions thereof will be omitted for conciseness.

Referring to FIG. 13A, the operating method of the robot device 100 according to an embodiment of the disclosure may include controlling the at least one tray 310 loaded with the object OB to move in a direction toward the head unit 400 after the movement unit 200 arrives at the target table DT. As an example of the disclosure, the at least one processor 600 (see FIG. 3) may control the at least one tray 310 loaded with the object OB to move in a direction toward the head unit 400 after the movement unit 200 arrives at the target table DT.

As an example of the disclosure, when the height of the at least one tray 310 loaded with the object OB is less than the height of the target table DT, the second user US2 may not easily unload the object OB from the at least one tray 310. Thus, the at least one processor 600 may move the at least one tray 310 loaded with the object OB in a direction toward the head unit 400 such that the second user US2 may easily unload the object OB from the at least one tray 310. However, the disclosure is not limited thereto. Even when the height of the at least one tray 310 loaded with the object OB is equal to or greater than the height of the target table DT, the at least one processor 600 may adjust the height of the at least one tray 310 based on the weight of the object OB, the height of the second user US2 obtained through the sensing unit 410, the height of a chair on which the second user US2 is sitting, an expected muscle power of the second user US2 obtained by scanning the body of the second user US2, and/or the like.

FIG. 13A illustrates that the at least one tray 310 loaded with the object OB moves in a direction toward the head unit 400; however, the disclosure is not limited thereto. When the height of the at least one tray 310 loaded with the object OB is relatively high and thus the second user US2 may not easily unload the object OB, the at least one tray 310 loaded with the object OB may move in a direction toward the movement unit 200 such that the second user US2 may easily unload the object OB from the at least one tray 310.

Referring to FIG. 13B, in an embodiment of the disclosure, the operating method of the robot device 100 may include controlling the at least one tray 310 to move in a direction toward the movement unit 200 when the object OB is unloaded from the at least one tray 310. As an example of the disclosure, when the object OB is unloaded from the at least one tray 310, the at least one processor 600 may control the at least one tray 310 to move in a direction toward the movement unit 200.

In an embodiment of the disclosure, the controlling of the at least one tray 310 to move in a direction toward the movement unit 200 may include controlling the at least one tray 310 to move in a direction toward the movement unit 200 when information about the approach of the second user US2 is not obtained for a preset time or more. In an embodiment of the disclosure, the at least one processor 600 may control the at least one tray 310 to move in a direction toward the movement unit 200 when information about the approach of the second user US2 on the target table DT is not obtained through the sensing unit 410 for a preset time or more.

In an embodiment of the disclosure, the controlling of the at least one tray 310 to move in a direction toward the movement unit 200 may include obtaining a weight corresponding to the at least one tray 310 through the weight sensor 330 (see FIG. 3) and controlling the at least one tray 310 to move in a direction toward the movement unit 200 when the obtained weight is less than or equal to a preset weight. In an embodiment of the disclosure, the at least one processor 600 may control the at least one tray 310 to move in a direction toward the movement unit 200 when the weight corresponding to the at least one tray 310 obtained through the weight sensor 330 is less than or equal to a preset weight.

FIG. 13B illustrates that the at least one tray 310 loaded with the object OB is moved in a direction toward the movement unit 200; however, the disclosure is not limited thereto. When the at least one tray 310 loaded with the object OB is moved in a direction toward the movement unit 200, the at least one tray 310 with the object OB unloaded therefrom may be moved in a direction toward the head unit 400.

FIG. 14 is a flowchart for describing an operating method of a robot device for rotating a head unit such that a user interface unit may face a side surface of a target table, according to an embodiment of the disclosure.

Figure 15:
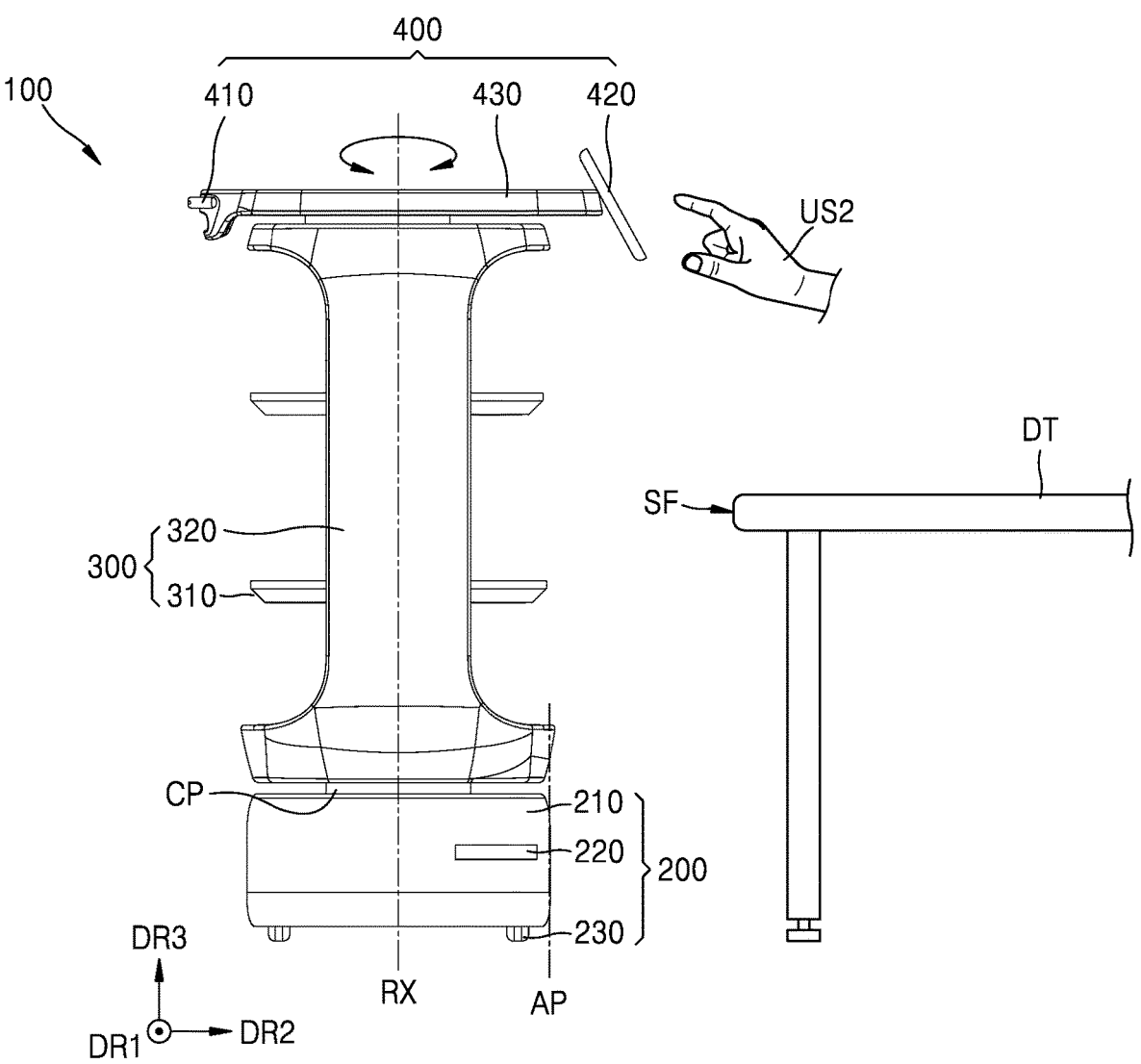
FIG. 15 is a diagram for describing an operating method of a robot device for rotating a head unit such that a user interface unit may face a side surface of a target table according to an embodiment of the disclosure.

FIG. 15 is a diagram for describing an operating method of a robot device for rotating a head unit such that a user interface unit may face a side surface of a target table according to an embodiment of the disclosure.

Hereinafter, like reference numerals will be assigned to like components and operations described above with reference to FIGS. 2, 6, and 11, and redundant descriptions thereof will be omitted for conciseness.

Referring to FIGS. 14 and 15, in an embodiment of the disclosure, the operating method of the robot device 100 may include, after the controlling of the at least one tray 310 to enter in a direction from the target table DT toward the support unit 320 at operation S600, controlling the head unit 400 such that the user interface unit 420 may rotate toward the side surface SF of the target table DT when information about the approach of the user is obtained through the sensing unit 410 at operation S700. As an example of the disclosure, after the at least one tray 310 enters in a direction toward the support unit 320, as information about the approach of the second user US2 on the target table DT is obtained through the sensing unit 410, the at least one processor 600 (see FIG. 3) may rotate the head unit 400 such that the user interface unit 420 may face the side surface SF of the target table DT.

In an embodiment of the disclosure, the robot device 100 may receive a separate external input through the user interface unit 420 after unloading the object OB from the at least one tray 310. In an embodiment of the disclosure, the separate external input may include information indicating that the unloading of the object OB from the at least one tray 310 is completed, information for ordering additional objects, information for ordering other requests other than additional objects, and/or the like. When information about the approach of the second user US2 intending to provide a separate external input is obtained through the sensing unit 410, the at least one processor 600 may rotate the head unit

400 such that the user interface unit 420 may face the side surface SF of the target table DT. Accordingly, the second user US2 may easily provide a separate external input.

However, the disclosure is not limited thereto. Even when the object OB is not unloaded from the at least one tray 310, after the at least one tray 310 is controlled to enter in a direction toward the support unit 320, as information about the approach of the second user US2 on the target table DT is obtained through the sensing unit 410, the head unit 400 may be rotated such that the user interface unit 420 may face the side surface SF of the target table DT. In this case, the robot device 100 may receive, through the user interface unit 420, a separate external input including information indicating that the object OB different from the order has been delivered, information indicating that the delivered object OB is wrong, and/or the like.

FIG. 16 is a flowchart for describing an operating method of a robot device for controlling a movement unit to move to a point close to a user at a target table, according to an embodiment of the disclosure.

Figure 17:
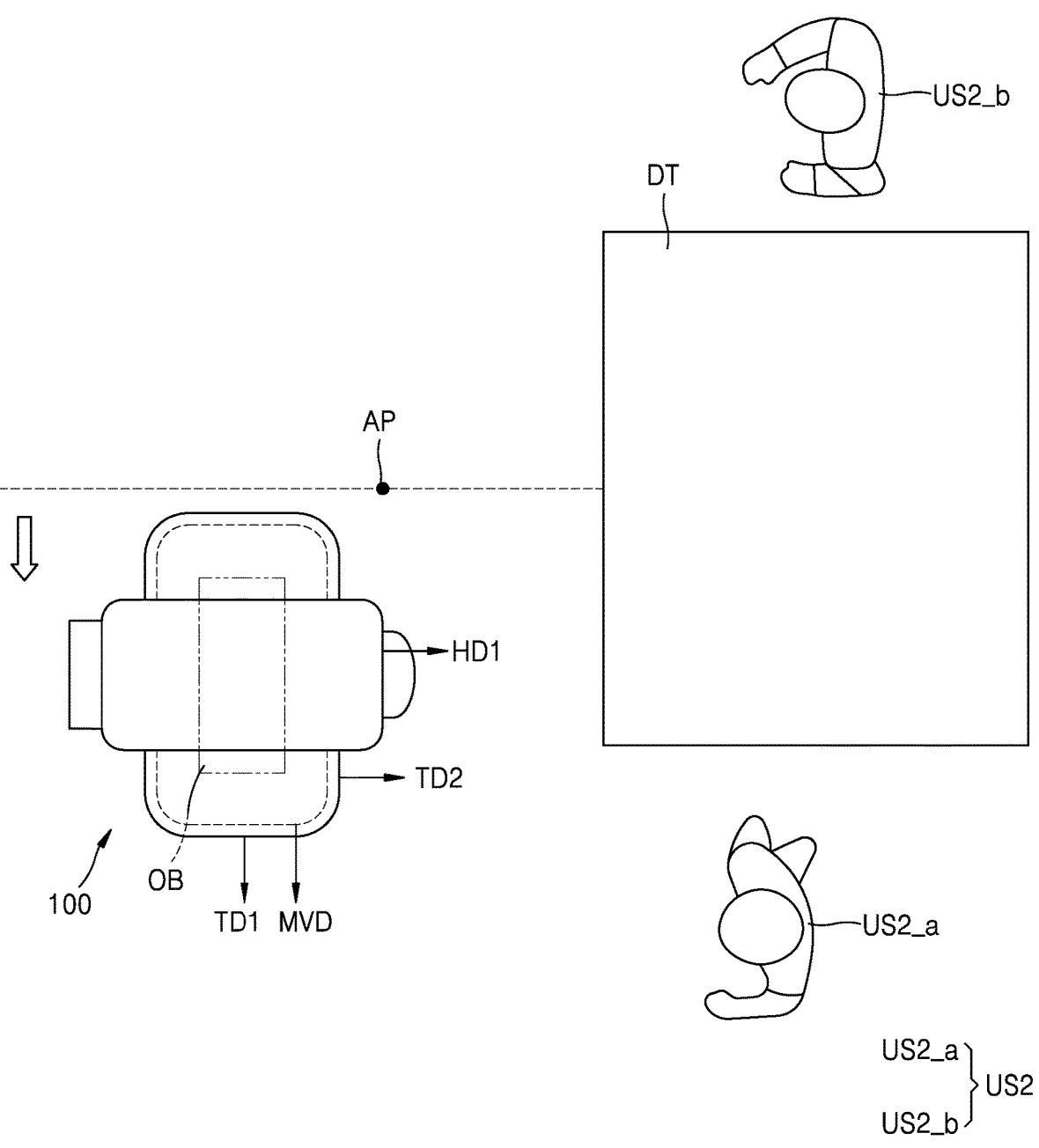
FIG. 17 is a diagram for describing an operating method of a robot device for controlling a movement unit to move to a point close to a user at a target table, according to an embodiment of the disclosure.

FIG. 17 is a diagram for describing an operating method of a robot device for controlling a movement unit to move to a point close to a user at a target table, according to an embodiment of the disclosure.

Hereinafter, like reference numerals will be assigned to like operations described above with reference to FIG. 6, and redundant descriptions thereof will be omitted for conciseness.

Referring to FIGS. 2, 16, and 17, in an embodiment of the disclosure, the operating method of the robot device 100 may include controlling the sensing unit 410 to obtain information about the relative position of the second user US2 on the target table DT at operation S800. In an embodiment of the disclosure, the at least one processor 600 (see FIG. 3) may obtain information about the relative position of the second user US2 on the target table DT through the sensing unit 410. In an embodiment of the disclosure, the operating method of the robot device 100 may include controlling the sensing unit 410 to obtain information about the relative position of the second user US2 after the movement unit 200 arrives at the target table DT at operation S800. In an embodiment of the disclosure, after the movement unit 200 arrives at the target table DT, the at least one processor 600 (see FIG. 3) may obtain information about the relative position of the second user US2 on the target table DT through the sensing unit 410.

In an embodiment of the disclosure, the second user US2 may include a first sub user US2_a and a second sub user US2_b. The at least one processor 600 may obtain information about the relative positions of the first sub user US2_a and the second sub user US2_b through the sensing unit 410. As an example of the disclosure, the at least one processor 600 may compare the relative positions of the first sub user US2_a and the second sub user US2_b by comparing the distance from the arrival point AP to the first sub user US2_a and the distance from the arrival point AP to the second sub user US2_b through the sensing unit 410.

FIG. 17 illustrates that two second users US2 are included on the target table DT; however, the disclosure is not limited thereto. One second user US2 or three or more second users US2 may be included on the target table DT. The at least one processor 600 may obtain information about the relative position of the second user US2 based on the distance from the arrival point AP to the second user US2 included on the target table DT.

In an embodiment of the disclosure, the operating method of the robot device 100 may include controlling, based on the information about the relative position of the second user US2, the movement unit 200 such that the movement unit 200 may move to a point close to the second user US2 on the side surface SF of the target table DT at operation S900. In an embodiment of the disclosure, based on the information about the relative position of the second user US2, the at least one processor 600 may control the movement unit 200 such that the movement unit 200 may be located at a point close to the second user US2 on the side surface SF of the target table DT.

In an embodiment of the disclosure, the controlling of the movement unit 200 such that the movement unit 200 may move to a point close to the second user US2 on the side surface SF of the target table DT at operation S900 may include controlling the movement unit 200 to be located at a point close to the first sub user US2_a located at a relatively short distance from the arrival point AP. In an embodiment of the disclosure, the at least one processor 600 may move the movement unit 200 to be located at a point close to the first sub user US2_a located at a relatively short distance from the arrival point AP.

In an embodiment of the disclosure, the controlling of the movement unit 200 such that the movement unit 200 may move to a point close to the second user US2 on the side surface SF of the target table DT at operation S900 may include controlling the movement unit 200 to move to a point close to the second user US2 while maintaining a state where the direction TD2 perpendicular to the side surface TS2 not covered by the support unit 320 among the side surfaces of the at least one tray 310 is perpendicular to the side surface SF of the target table DT. In an embodiment of the disclosure, the at least one processor 600 may move the movement unit 200 to a point close to the second user US2 while maintaining a state where the direction TD2 perpendicular to the side surface TS2 not covered by the support unit 320 among the side surfaces of the at least one tray 310 is perpendicular to the side surface SF of the target table DT.

As an example of the disclosure, based on the information about the relative position of the second user US2 obtained through the sensing unit 410, by locating the movement unit 200 at a point close to the first sub user US2_a located relatively close on the side surface SF of the target table DT, the first sub user US2_a may easily unload the object OB from the at least one tray 310.

However, the disclosure is not limited thereto. The at least one processor 600 may obtain, through the sensing unit 410, information about the person intending to unload the object OB from the at least one tray 310 among the second users US2. As an example of the disclosure, the at least one processor 600 may obtain, through the sensing unit 410, information indicating the first sub user US2_a among the first sub user US2_a and the second sub user US2_b intends to unload the object OB. In an embodiment of the disclosure, the at least one processor 600 may obtain information about the person intending to unload the object OB by sensing information about the approach of the first sub user US2_a through the sensing unit 410. In this case, the at least one processor 600 may control the movement unit 200 such that the movement unit 200 may move to a point close to the first sub user US2_a on the side surface SF of the target table DT, thus allowing the first sub user US2_a to easily unload the object OB from the at least one tray 310.

A program executed by the robot device 100 described herein may be implemented as a hardware component, a software component, and/or a combination of a hardware component and a software component. The program may be performed by any system capable of executing computer-readable instructions.

The software may include computer programs, code, instructions, or a combination of one or more thereof and may configure the processor to operate as desired or may instruct the processor independently or collectively.

The software may be implemented as a computer program including instructions stored in a computer-readable storage medium. The computer-readable recording medium may include, for example, a magnetic storage medium (e.g., read-only memory (ROM), random-access memory (RAM), floppy disk, or hard disk) and an optical readable medium (e.g., CD-ROM or digital versatile disc (DVD)). The computer-readable recording medium may be distributed in network-connected computer systems such that computer-readable codes may be stored and executed in a distributed manner. The recording medium may be readable by a computer, stored in a memory, and executed in a processor.

The computer-readable storage medium may be provided in the form of a non-transitory storage medium. Here, the term "non-transitory storage medium" may mean that the storage medium is a tangible device and does not include signals (e.g., electromagnetic waves), and may mean that data may be semi-permanently or temporarily stored in the storage medium. For example, the "non-transitory storage medium" may include a buffer in which data is temporarily stored.

Also, the program according to the embodiment described herein may be included and provided in a computer program product. The computer program product may be traded as a product between a seller and a buyer.

The computer program product may include a software program and a computer-readable storage medium with a software program stored therein. For example, the computer program product may include a product (e.g., a download-able application) in the form of a software program electronically distributed through a manufacturer of the robot device 100 or an electronic market (e.g., Samsung Galaxy Store). For electronic distribution, at least a portion of the software program may be stored in a storage medium or may be temporarily generated. In this case, the storage medium may be a storage medium of a server of the manufacturer of the robot device 100, a server of the electronic market, or a relay server for temporarily storing the software program.

According to an embodiment of the disclosure, a robot device 100 and an operating method thereof may prevent an object receiver from feeling unfamiliarity with the robot device 100, by allowing the open side of a tray 310 to face a target table DT when the robot device 100 arrives at the target table DT, by rotating a body unit 300 including the tray 310 accommodating an object OB independently of a movement unit 200 while the movement unit 200 of the robot device 100 moves to the target table DT. Also, according to an embodiment of the disclosure, the object receiver may be prevented from feeling unfamiliarity with the robot device 100, by allowing a sensing unit 410 to face the target table DT when the robot device 100 arrives at the target table DT, by rotating a head unit 400 including sensing unit 410 independently of the movement unit 200 while the movement unit 200 of the robot device 100 moves to the target table DT.

In order to solve the above technical problems, an embodiment of the disclosure may provide a robot device 100 for delivering an object OB to a target table DT. The robot device 100 according to an embodiment of the disclosure may include a movement unit 200 for moving the robot device 100. The robot device 100 may include a body unit 300 coupled to an upper end of the movement unit 200, the body unit 300 including at least one tray 310 configured to accommodate the object OB and a support unit 320 configured to support the at least one tray 310 at a certain height. The robot device 100 may include a memory 500 configured to store at least one instruction and at least one processor 600 configured to execute the at least one instruction stored to receive an external input including information about the target table DT. The at least one processor 600 may control, based on the information about the target table DT, the movement unit 200 to move to the target table DT. The at least one processor 600 may start to rotate the body unit 300 independently of the movement unit 200 as the movement unit 200 is located at a first certain distance from the target table DT during the movement thereto. The at least one processor 600 may stop the rotation of the body unit 300 when a side surface TS2 not covered by the support unit 320 among the side surfaces of the at least one tray 310 is parallel to a side surface SF of the target table DT.

In an embodiment of the disclosure, when the movement unit 200 is located at a distance greater than the first certain distance from the target table DT, the at least one processor 600 may control the body unit 300 to set a direction TD1 perpendicular to a side surface TS1 covered by the support unit 320 among the side surfaces of the at least one tray 310 parallel to a movement direction MVD of the movement unit 200. When the movement unit 200 is located at a first certain distance or a distance less than the first certain distance from the target table DT, the at least one processor 600 may control the body unit 300 to set the direction TD1 perpendicular to the side surface TS1 covered by the support unit 320 among the side surfaces of the at least one tray 310 to intersect the movement direction MVD of the movement unit 200.

In an embodiment of the disclosure, when the movement unit 200 is located at a distance greater than the first certain distance from the target table DT, the at least one processor 600 may control the body unit 300 to set the direction TD2 perpendicular to the side surface TS2 not covered by the support unit 320 among the side surfaces of the at least one tray 310 parallel to the movement direction MVD of the movement unit 200. When the movement unit 200 is located at a first certain distance or a distance less than the first certain distance from the target table DT, the at least one processor 600 may control the body unit 300 to set the direction TD2 perpendicular to the side surface TS2 not covered by the support unit 320 among the side surfaces of the at least one tray 310 to intersect the movement direction MVD of the movement unit 200.

In an embodiment of the disclosure, the robot device 100 may further include a head unit 400 coupled to an upper end of the body unit 300 and including a sensing unit 410 for sensing an object around the robot device 100. The at least one processor 600 may start to rotate the head unit 400 independently of the movement unit 200 as the movement unit 200 is located at a second certain distance different from the first certain distance from the target table DT during the movement thereto. The at least one processor 600 may stop the rotation of the head unit 400 when a facing direction HD of the sensing unit 410 is perpendicular to the side surface SF of the target table DT.

In an embodiment of the disclosure, the at least one processor 600 may obtain information about the relative position of a user US2 on the target table DT through the sensing unit 410. Based on the information about the relative position of the user US2, the at least one processor 600 may control the movement unit 200 to set the movement unit 200 at a point close to the user US2 on the side surface SF of the target table DT.

In an embodiment of the disclosure, the at least one processor 600 may control the at least one tray 310 loaded with the object OB to exit in a direction from the support unit 320 toward the target table DT after the movement unit 200 arrives at the target table DT. When the object OB is unloaded from the at least one tray 310, the at least one processor 600 may control the at least one tray 310 to enter in a direction from the target table DT toward the support unit 320.

In an embodiment of the disclosure, the at least one processor 600 may obtain information about an approach of the user US2 on the target table DT through the sensing unit 410. Based on the information about the approach of the user US2, the at least one processor 600 may control the at least one tray 310 loaded with the object OB to exit in a direction from the support unit 320 toward the target table DT.

In an embodiment of the disclosure, the at least one processor 600 may control the at least one tray 310 to enter in a direction from the target table DT toward the support unit 320 when information about the approach of the user US2 on the target table DT is not obtained through the sensing unit 410 for a preset time or more.

In an embodiment of the disclosure, the body unit 300 may further include a weight sensor 330 capable of obtaining a weight corresponding to the at least one tray 310. The at least one processor 600 may control the at least one tray 310 to enter in a direction from the target table DT toward the support unit 320 when the weight corresponding to the at least one tray 310 obtained through the weight sensor 330 is less than or equal to a preset weight.

In an embodiment of the disclosure, the head unit 400 may further include a user interface unit 420 for receiving an external input. After the at least one tray 310 enters in a direction toward the support unit 320, as information about the approach of the user US2 on the target table DT is obtained through the sensing unit 410, the at least one processor 600 may rotate the head unit 400 to set the user interface unit 420 to face the side surface SF of the target table DT.

In order to solve the above technical problems, an embodiment of the disclosure may provide an operating method of a robot device 100 for delivering an object OB to a target table DT. According to an embodiment of the disclosure, the robot device 100 may include a body unit 300 including at least one tray 310 configured to accommodate the object OB and a support unit 320 configured to support the at least one tray 310 at a certain height. According to an embodiment of the disclosure, the operating method of the robot device 100 may include receiving an external input including information about the target table DT at operation S100. The operating method of the robot device 100 may include controlling, based on the information about the target table DT, a movement unit 200 coupled to a lower end of the body unit 300 to move to the target table DT at operation S200. The operating method of the robot device 100 may include controlling the body unit 300 to start to rotate independently of the movement unit 200 as the movement unit 200 is located at a first certain distance from the target table DT during the movement thereto at operation S310. The operating method of the robot device 100 may include controlling the body unit 300 to stop the rotation when a side surface TS2 not covered by the support unit 320 among the side surfaces of the at least one tray 310 is parallel to a side surface SF of the target table DT at operation S320.

In an embodiment of the disclosure, the controlling of the body unit 300 may include controlling, when the movement unit 200 is located at a distance greater than the first certain distance from the target table DT, the body unit 300 to set a direction TD1 perpendicular to a side surface TS1 covered by the support unit 320 among the side surfaces of the at least one tray 310 parallel to a movement direction MVD of the movement unit 200 at operation S312*a*. The controlling of the body unit 300 may include controlling, when the movement unit 200 is located at a first certain distance or a distance less than the first certain distance from the target table DT, the body unit 300 to set the direction TD1 perpendicular to the side surface TS1 covered by the support unit 320 among the side surfaces of the at least one tray 310 to intersect the movement direction MVD of the movement unit 200 at operation S313*a*.

In an embodiment of the disclosure, the controlling of the body unit 300 may include controlling, when the movement unit 200 is located at a distance greater than the first certain distance from the target table DT, the body unit 300 to set a direction TD2 perpendicular to the side surface TS2 not covered by the support unit 320 among the side surfaces of the at least one tray 310 parallel to the movement direction MVD of the movement unit 200 at operation S312*b*. The controlling of the body unit 300 may include controlling, when the movement unit 200 is located at a first certain distance or a distance less than the first certain distance from the target table DT, the body unit 300 to set the direction TD2 perpendicular to the side surface TS2 not covered by the support unit 320 among the side surfaces of the at least one tray 310 to intersect the movement direction MVD of the movement unit 200 at operation S313*b*.

In an embodiment of the disclosure, the robot device 100 may further include a head unit 400 coupled to an upper end of the body unit 300, the head unit 400 including a sensing unit 410 for sensing an object around the robot device 100. The operating method of the robot device 100 may include controlling the head unit 400 to start to rotate independently of the movement unit 200 as the movement unit 200 is located at a second certain distance different from the first certain distance from the target table DT during the movement thereto at operation S410. The operating method of the robot device 100 may include controlling the head unit 400 to stop the rotation when a facing direction HD of the sensing unit 410 is perpendicular to the side surface SF of the target table DT at operation S420.

In an embodiment of the disclosure, the operating method of the robot device 100 may include controlling the sensing unit 410 to obtain information about the relative position of a user US2 on the target table DT at operation S800. The operating method of the robot device 100 may include controlling, based on the information about the relative position of the user US2, the movement unit 200 to set the movement unit 200 at to a point close to the user US2 on the side surface SF of the target table DT at operation S900.

In an embodiment of the disclosure, the operating method of the robot device 100 may include controlling the at least one tray 310 loaded with the object OB to exit in a direction from the support unit 320 toward the target table DT after the movement unit 200 arrives at the target table DT at operation S500. The operating method of the robot device 100 may include controlling the at least one tray 310 to enter in a direction from the target table DT toward the support unit 320 when the object OB is unloaded from the at least one tray 310 at operation S600.

In an embodiment of the disclosure, the controlling of the at least one tray 310 loaded with the object OB to exit in a direction from the support unit 320 toward the target table DT at operation S500 may include controlling the sensing unit 410 to obtain information about an approach of the user US2 on the target table DT. The controlling of the at least one tray 310 loaded with the object OB to exit in a direction from the support unit 320 toward the target table DT at operation S500 may include controlling, based on the information about the approach of the user US2, the at least one tray 310 loaded with the object OB to exit in a direction from the support unit 320 toward the target table DT.

In an embodiment of the disclosure, the controlling of the at least one tray 310 to enter in a direction from the target table DT toward the support unit 320 at operation S600 may include controlling the sensing unit 410 to obtain information about the approach of the user US2 on the target table DT. The controlling of the at least one tray 310 to enter in a direction from the target table DT toward the support unit 320 at operation S600 may include controlling the at least one tray 310 to enter in a direction from the target table DT toward the support unit 320 when information about the approach of the user US2 is not obtained for a preset time or more.

In an embodiment of the disclosure, the controlling of the at least one tray 310 to enter in a direction from the target table DT toward the support unit 320 at operation S600 may include obtaining a weight of the object OB arranged on the at least one tray 310. The controlling of the at least one tray 310 to enter in a direction from the target table DT toward the support unit 320 at operation S600 may include controlling the at least one tray 310 to enter in a direction from the target table DT toward the support unit 320 when the obtained weight of the object OB is less than or equal to a preset weight.

In an embodiment of the disclosure, the head unit 400 may further include a user interface unit 420 for receiving an external input. The operating method of the robot device 100 may include, after the controlling of the at least one tray 310 to enter in a direction from the target table DT toward the support unit 320 at operation S600, controlling the head unit 400 such that the user interface unit 420 may rotate toward the side surface SF of the target table DT when information about the approach of the user US2 is obtained through the sensing unit 410 at operation S700.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot device for delivering an object to a target table having a rectangular shape, the robot device comprising:
 a sub-body with rollers configured to move the robot device;
 a body coupled to an upper end of the sub-body with rollers and configured to rotate independently of the sub-body with rollers about a rotation axis, the body comprising:
 a tray configured to accommodate the object and comprising a plurality of side surfaces; and
 a tray support configured to support the tray being located at a certain height;
 a memory configured to store at least one instruction; and
 at least one processor configured to execute the at least one instruction, wherein the plurality of side surfaces comprise a first side surface that is covered by the tray support and a second side surface that is not covered by the tray support, wherein the at least one processor is further configured to execute the at least one instruction to:

receive an external input including information about the target table, control, based on the information about the target table, the sub-body with rollers to move to the target table by:

turning, in response to the sub-body with rollers being located at a distance greater than a first certain distance from the target table, the body such that a direction perpendicular to the first side surface is parallel to a movement direction of the sub-body with rollers, and turning, in response to the sub-body with rollers being located at the first certain distance or at a distance smaller than the first certain distance from the target table, the body such that a direction perpendicular to the first side surface and the movement direction of the sub-body with rollers are different, and stopping rotation of the body in response to the second side surface being parallel to a side surface that is closest to the robot device among a plurality of side surfaces of the target table, wherein the first certain distance is a distance at which the body starts to rotate independently of the sub-body with rollers, the first certain distance being obtained based on at least one of information about the target table, a movement path of the robot device, or a rotation speed of the body.

2. The robot device of claim 1, further comprising:

a head coupled to an upper end of the body, the head comprising a sensor configured to sense a peripheral object of the robot device, wherein the at least one processor is further configured to execute the at least one instruction to:

start to rotate the head independently of the sub-body with rollers, as the sub-body with rollers is located at a second certain distance different from the first certain distance from the target table during movement thereto, and stop the rotation of the head in response to a facing direction of the sensor being perpendicular to a side surface of the target table.

3. The robot device of claim 2, wherein the at least one processor is further configured to execute the at least one instruction to:

obtain information about a relative position of a user at the target table through the sensor, and control, based on the information about the relative position of the user, the sub-body with rollers to move the sub-body with rollers to a point close to the user near the side surface of the target table.

4. The robot device of claim 2, wherein the at least one processor is further configured to execute the at least one instruction to:

control, after the sub-body with rollers arrives at the target table, the tray configured to accommodate the object to exit in a direction from the tray support toward the target table, and control, in response to the object being removed from the tray, the tray to enter in a direction from the target table toward the tray support.

5. The robot device of claim 4, wherein the at least one processor is further configured to execute the at least one instruction to:

obtain information about a user approaching the target table through the sensor, and control, based on the information about the user approaching the target table, the tray configured to accommodate the object to exit in a direction from the tray support toward the target table.

6. The robot device of claim 4, wherein the at least one processor is further configured to execute the at least one instruction to control, in response to information about a user approaching the target table not being obtained for a preset time or more through the sensor, the tray to enter in a direction from the target table toward the tray support.

7. The robot device of claim 4, wherein the body further comprises a weight sensor obtaining a weight corresponding to the tray configured to accommodate the object, and wherein the at least one processor is further configured to execute the at least one instruction to control, in response to the weight corresponding to the tray obtained through the weight sensor being less than or equal to a preset weight, the tray to enter in a direction from the target table toward the tray support.

8. The robot device of claim 4, wherein the head further comprises a user interface receiving the external input, and wherein the at least one processor is further configured to execute the at least one instruction to rotate, as information about a user approaching the target table is obtained through the sensor after the tray enters in a direction toward the tray support, the head to set the user interface to face the side surface of the target table.

9. A method of operating a robot device comprising a body comprising a tray configured to accommodate an object and comprising a plurality of side surfaces and a tray support configured to support the tray being located at a certain height, and being coupled to an upper end of a sub-body with rollers and configured to rotate independently of the sub-body with rollers, wherein the plurality of side surfaces comprise a first side surface that is covered by the tray support and a second side surface that is not covered by the tray support, the method comprising:

receiving an external input including information about a target table having a rectangular shape;

controlling, based on the information about the target table, the sub-body with rollers to move to the target table by:

turning, in response to the sub-body with rollers being located at a distance greater than a first certain distance from the target table, the body such that a direction perpendicular to the first side surface is parallel to a movement direction of the sub-body with rollers, and turning, in response to the sub-body with rollers being located at the first certain distance or at a distance smaller than the first certain distance from the target table, the body such that a direction perpendicular to the first side surface and the movement direction of the sub-body with rollers are different; and controlling the body to stop rotation in response to the second side surface being parallel to a side surface that is closest to the robot device among a plurality of side surfaces of the target table, wherein the first certain distance is a distance at which the body starts to rotate independently of the sub-body with rollers, the first certain distance being obtained based on at least one of information about the target table, a movement path of the robot device, or a rotation speed of the body.

10. The method of claim 9, wherein the robot device further comprises a head coupled to an upper end of the body, the head comprising a sensor sensing a peripheral object of the robot device, and wherein the method further comprises:

controlling the head to start to rotate independently of the sub-body with rollers, as the sub-body with rollers is located at a second certain distance different from the first certain distance from the target table during movement thereto; and controlling the head to stop the rotation in response to a facing direction of the sensor being perpendicular to a side surface of the target table.

11. The method of claim 10, further comprising:

controlling the sensor to obtain information about a relative position of a user at the target table; and controlling, based on the information about the relative position of the user, the sub-body with rollers to move the sub-body with rollers to a point close to the user near the side surface of the target table.

12. The method of claim 10, further comprising:

controlling, after the sub-body with rollers arrives at the target table, the tray configured to accommodate the object to exit in a direction from the tray support toward the target table; and controlling, in response to the object being removed from the tray, the tray to enter in a direction from the target table toward the tray support.

13. The method of claim 12, wherein the controlling of the tray configured to accommodate the object to exit in a direction from the tray support toward the target table comprises:

controlling the sensor to obtain information about a user approaching the target table; and controlling, based on the information about the user approaching the target table, the tray being loaded with the object to exit in a direction from the tray support toward the target table.

14. The method of claim 12, wherein the controlling of the tray to enter in a direction from the target table toward the tray support comprises controlling, in response to information about a user approaching the target table not being obtained for a preset time or more, the tray to enter in a direction from the target table toward the tray support.

15. The method of claim 12, wherein the controlling of the tray to enter in a direction from the target table toward the tray support comprises:

obtaining a weight corresponding to the tray; and controlling, in response to the obtained weight being less than or equal to a preset weight, the tray to enter in a direction from the target table toward the tray support.

16. The method of claim 12, wherein the head further comprises a user interface receiving the external input, and wherein the method further comprises, after the controlling of the tray to enter in a direction from the target table toward the tray support, controlling the head to rotate, in response to information about a user approaching the target table being obtained through the sensor, the head to set the user interface to face the side surface of the target table.

* * * * *